US012075478B2

(12) United States Patent
Myung et al.

(10) Patent No.: US 12,075,478 B2
(45) Date of Patent: Aug. 27, 2024

(54) METHOD OF PERFORMING CHANNEL ACCESS PROCEDURE AND APPARATUS THEREFOR

(71) Applicant: LG Electronics Inc., Seoul (KR)

(72) Inventors: Sechang Myung, Seoul (KR); Suckchel Yang, Seoul (KR); Jiwon Kang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/988,486

(22) Filed: Nov. 16, 2022

(65) Prior Publication Data

US 2023/0091023 A1   Mar. 23, 2023

Related U.S. Application Data

(63) Continuation of application No. 17/769,164, filed as application No. PCT/KR2022/000378 on Jan. 10, 2022.

(30) Foreign Application Priority Data

| Jan. 15, 2021 | (KR) | ......................... 10-2021-0005774 |
| Apr. 5, 2021 | (KR) | ......................... 10-2021-0043839 |
| May 10, 2021 | (KR) | ......................... 10-2021-0060166 |

(51) Int. Cl.
*H04W 74/0816* (2024.01)
*H04B 7/06* (2006.01)

(52) U.S. Cl.
CPC ...... *H04W 74/0816* (2013.01); *H04B 7/0695* (2013.01)

(58) Field of Classification Search
CPC ..... H04W 72/23; H04W 76/10; H04W 72/20; H04W 48/18; H04W 72/04; H04W 8/005; H04W 76/15
See application file for complete search history.

(56) References Cited

U.S. PATENT DOCUMENTS

| 2019/0104546 | A1 | 4/2019 | Kannan et al. |
| 2020/0154474 | A1* | 5/2020 | Lo .................... H04B 7/0617 |
| 2020/0336921 | A1 | 10/2020 | Yerramalli et al. |

(Continued)

FOREIGN PATENT DOCUMENTS

| KR | 20200029671 | 3/2020 |
| KR | 20200051636 | 5/2020 |

(Continued)

OTHER PUBLICATIONS

3GPP TSG RAN WG1 Meeting #103-e R1-2009675 Oct. 26-Nov. 13, 2020 (Year: 2020).*
International Search Report in International Appln. No. PCT/KR2022/000378, dated Apr. 22, 2022, 9 pages.

(Continued)

*Primary Examiner* — Khalid W Shaheed
(74) *Attorney, Agent, or Firm* — Fish & Richardson P.C.

(57) ABSTRACT

Disclosed is a method of transmitting an uplink signal by a user equipment in a wireless communication system. Specifically, the method includes performing listen-before-talk (LBT) based on at least one LBT beam, and transmitting the uplink signal through a plurality of transmission beams based on success of the LBT. The at least one LBT beam covers the plurality of transmission beams, and the plurality of transmission beams is multiplexed.

9 Claims, 28 Drawing Sheets

(56) References Cited

U.S. PATENT DOCUMENTS

| | | |
|---|---|---|
| 2020/0344036 A1 | 10/2020 | Hafeez et al. |
| 2020/0351758 A1 | 11/2020 | Bhattad et al. |
| 2020/0359230 A1 | 11/2020 | Yerramalli et al. |
| 2022/0295556 A1* | 9/2022 | Lo .......................... H04W 72/51 |

FOREIGN PATENT DOCUMENTS

| | | |
|---|---|---|
| KR | 20200133256 | 11/2020 |
| WO | WO 2019/160741 | 8/2019 |
| WO | WO 2019/192285 | 10/2019 |
| WO | WO 2019/210185 | 10/2019 |
| WO | WO2019217697 | 11/2019 |
| WO | WO 2020/057600 | 3/2020 |

OTHER PUBLICATIONS

Qualcomm Incorporated, "FL summary for channel access mechanism for 52.6GHz-71GHz band, ver 10," R1-2009760, Presented at 3GPP TSG RAN WG1 Meeting #103-e, Oct. 26-Nov. 13, 2020, 129 pages.

Extended European Search Report in European Appln. No. 22711854.4, dated Dec. 13, 2022, 9 pages.

Futurewei, "Considerations on directional LBT and spatial reuse," R1-2005282, Presented at 3GPP TSG RAN WG1 Meeting #102-e, eMeeting, Aug. 17-28, 2020, 3 pages.

Search Report in Korean Appln. No. 10-2022-7013783, dated Nov. 8, 2022, 14 pages (with English translation).

Office Action in U.S. Appl. No. 17/769,164, mailed on Mar. 14, 2024, 9 pages.

\* cited by examiner

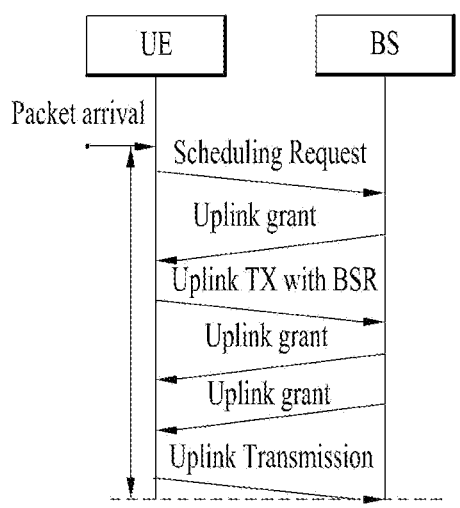 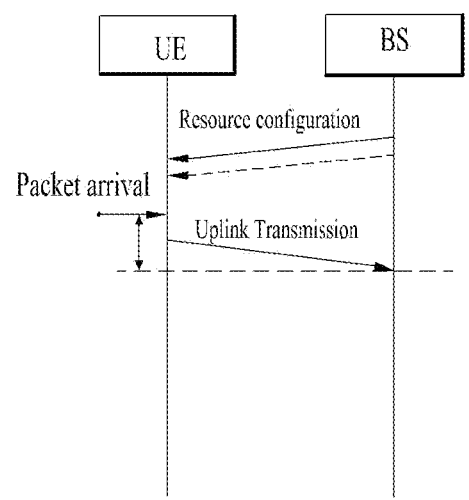
Uplink Tx procedure based on dynamic grant
FIG. 5A
Uplink Tx procedure based on configured grant
FIG. 5B Option 1

Option 2

Carrier aggregation between L-band and U-band

Standalone U-band(s)

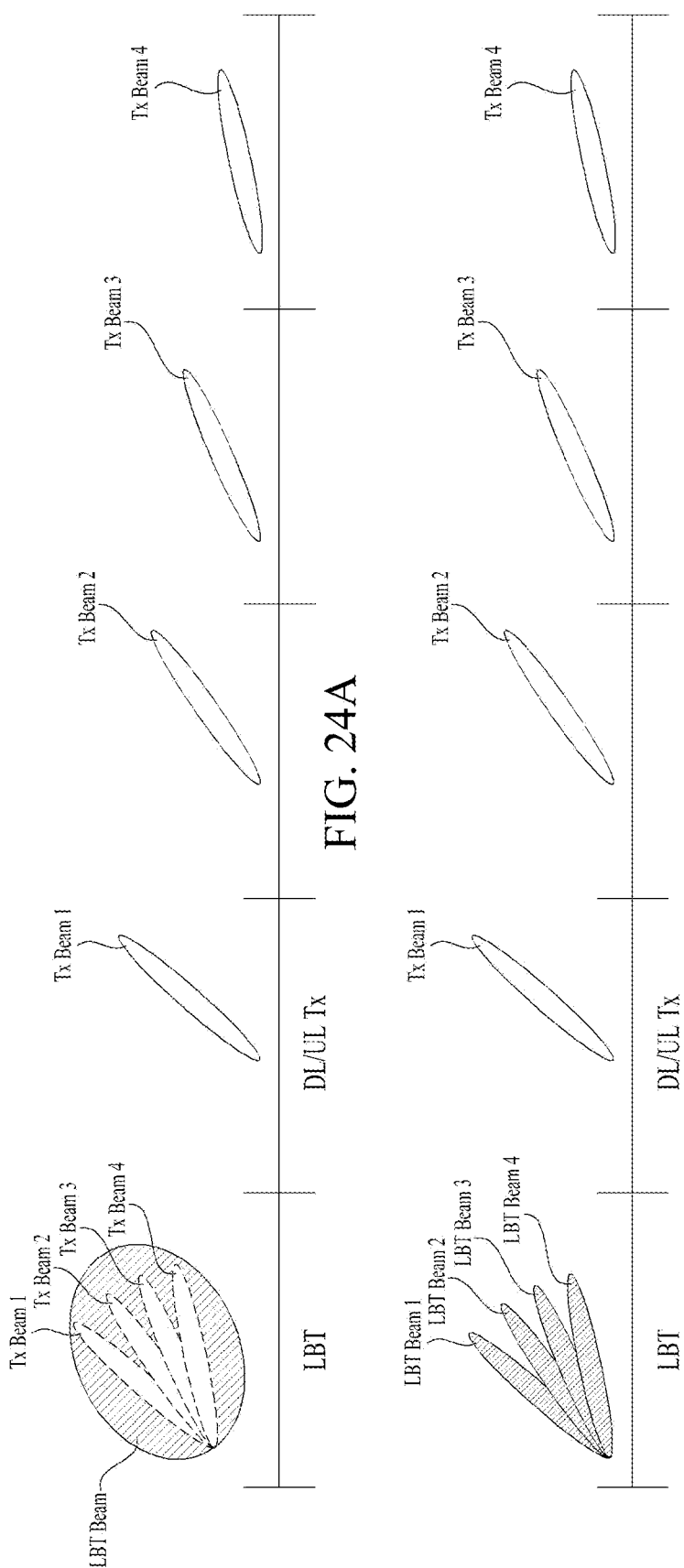

METHOD OF PERFORMING CHANNEL ACCESS PROCEDURE AND APPARATUS THEREFOR

CROSS-REFERENCE TO RELATED APPLICATIONS

This application is a continuation of U.S. application Ser. No. 17/769,164, filed on Apr. 14, 2022, which is a National Stage application under 35 U.S.C. § 371 of International Application No. PCT/KR2022/000378, filed on Jan. 10, 2022, which claims the benefit of Korean Application Nos. 10-2021-0060166, filed on May 10, 2021, 10-2021-0043839, filed on Apr. 5, 2021, and 10-2021-0005774, filed on Jan. 15, 2021. The disclosures of the prior applications are hereby incorporated by reference herein in their entirety.

TECHNICAL FIELD

The present disclosure relates to a method of performing a channel access procedure and an apparatus therefor and, more particularly, to a method of performing a channel access procedure for transmitting and receiving signals through multiplexed transmission beams, and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of performing a channel access procedure and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, provided herein is a method of transmitting an uplink signal by a user equipment (UE) in a wireless communication system, including performing listen-before-talk (LBT) based on at least one LBT beam, and transmitting the uplink signal through a plurality of transmission beams based on success of the LBT. The at least one LBT beam may cover the plurality of transmission beams, and the plurality of transmission beams may be multiplexed.

The plurality of transmission beams may be multiplexed using spatial division multiplexing (SDM).

The plurality of transmission beams may be multiplexed using time division multiplexing (TDM).

The at least one LBT beam may be a single LBT beam covering all of the plurality of transmission beams.

The at least one LBT beam may include a plurality of LBT beams, and each of the plurality of LBT beams may cover each of the plurality of transmission beams.

Category 2 (Cat-2) LBT may be performed before beam switching is performed between the plurality of transmission beams.

In another aspect of the present disclosure, provided herein is a user equipment (UE) for transmitting an uplink signal in a wireless communication system, including at least one transceiver; at least one processor; and at least one memory operably connected to the at least one processor and configured to store instructions causing, when executed, the at least one processor to perform an operation. The operation may include performing listen-before-talk (LBT) based on at least one LBT beam, and transmitting, through the at least one transceiver, the uplink signal through a plurality of transmission beams based on success of the LBT. The at least one LBT beam may cover the plurality of transmission beams, and the plurality of transmission beams may be multiplexed.

The plurality of transmission beams may be multiplexed using spatial division multiplexing (SDM).

The plurality of transmission beams may be multiplexed using time division multiplexing (TDM).

The at least one LBT beam may be a single LBT beam covering all of the plurality of transmission beams.

The at least one LBT beam may include a plurality of LBT beams, and each of the plurality of LBT beams may cover each of the plurality of transmission beams.

Category 2 (Cat-2) LBT may be performed before beam switching is performed between the plurality of transmission beams.

In another aspect of the present disclosure, provided herein is an apparatus for transmitting an uplink signal in a wireless communication system, including at least one processor; and at least one memory operably connected to the at least one processor and configured to store instructions causing, when executed, the at least one processor to perform an operation. The operation may include performing listen-before-talk (LBT) based on at least one LBT beam, and transmitting the uplink signal through a plurality of transmission beams based on success of the LBT. The at least one LBT beam may cover the plurality of transmission beams, and the plurality of transmission beams may be multiplexed.

In another aspect of the present disclosure, provided herein is a computer-readable storage medium including at least one computer program causing at least one processor to perform an operation. The operation may include performing listen-before-talk (LBT) based on at least one LBT beam, and transmitting the uplink signal through a plurality of transmission beams based on success of the LBT. The at least one LBT beam may cover the plurality of transmission beams, and the plurality of transmission beams may be multiplexed.

In another aspect of the present disclosure, provided herein is a method of transmitting a downlink signal by a base station in a wireless communication system, including performing listen-before-talk (LBT) based on at least one LBT beam, and transmitting the downlink signal through a plurality of transmission beams based on success of the LBT. The at least one LBT beam may cover the plurality of transmission beams, and the plurality of transmission beams may be multiplexed.

In another aspect of the present disclosure, provided herein is a base station for transmitting a downlink signal in a wireless communication system, including at least one transceiver; at least one processor; and at least one memory operably connected to the at least one processor and configured to store instructions causing, when executed, the at least one processor to perform an operation. The operation may include performing listen-before-talk (LBT) based on at least one LBT beam, and transmitting, through the at least one transceiver, the downlink signal through a plurality of transmission beams based on success of the LBT. The at least one LBT beam may cover the plurality of transmission beams, and the plurality of transmission beams may be multiplexed.

According to the present disclosure, in order to overcome relatively large path loss occurring in a high-frequency band of 52.6 GHz or higher, a BS and/or a UE may use directional listen-before-talk (D-LBT) and, when transmission beams in different directions are multiplexed within an obtained channel occupancy time (COT), a proper energy detection (ED) value, an LBT bandwidth, and/or an LBT beam for three multiplexed transmission beams may be configured.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 5A and 5B illustrate exemplary uplink (UL) transmission operations of a user equipment (UE);

FIGS. 23A to 25B are diagrams illustrating methods of performing LBT for a plurality of multiplexed beams according to an embodiment of the present disclosure;

DETAILED DESCRIPTION

Figure 1:
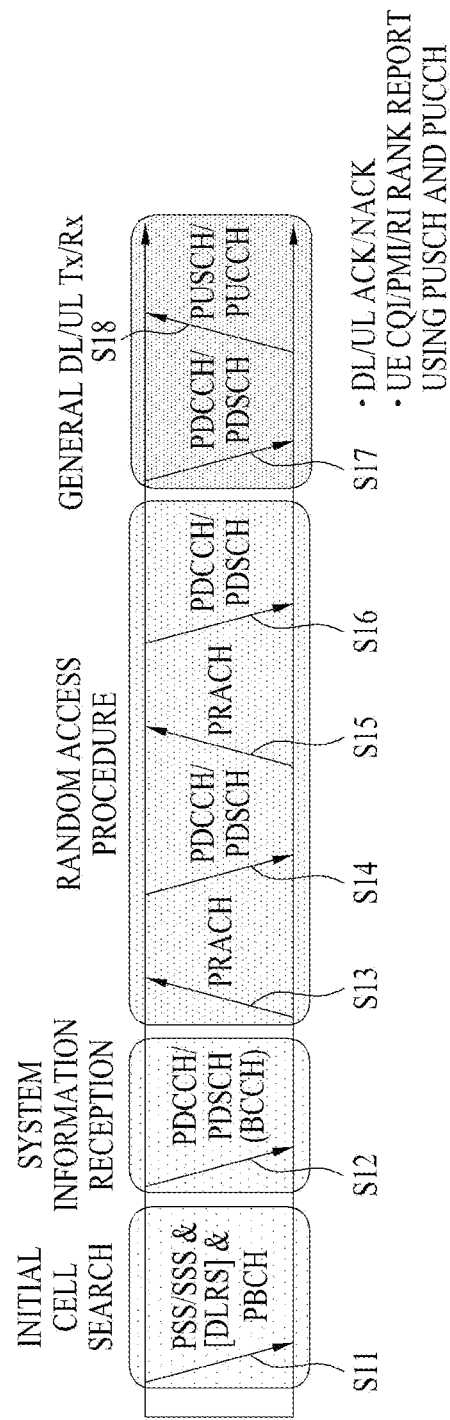
FIG. 1 illustrates physical channels and a general signal transmission method using the physical channels in a 3rd generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
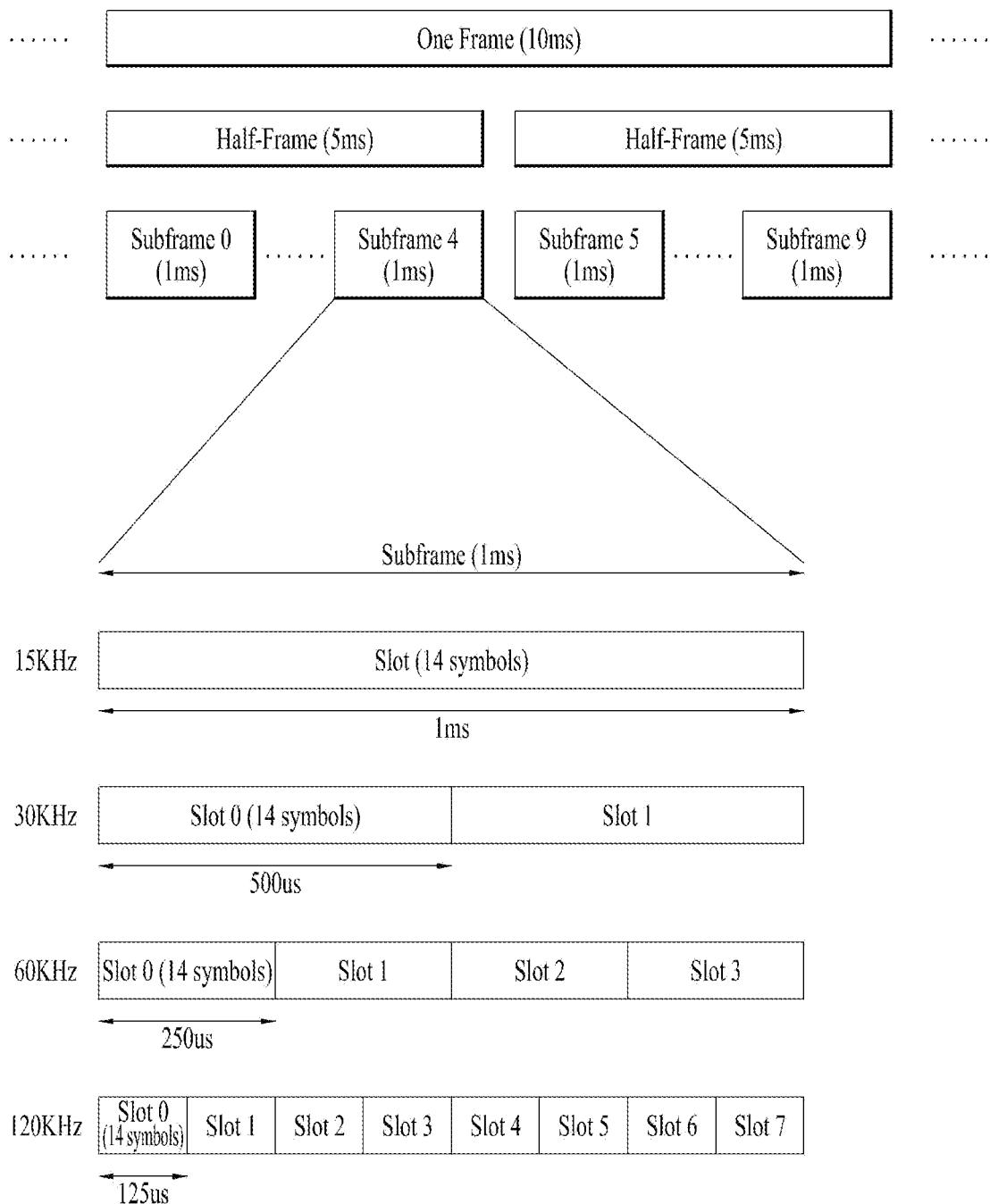
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: slot number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5$^{th}$ generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
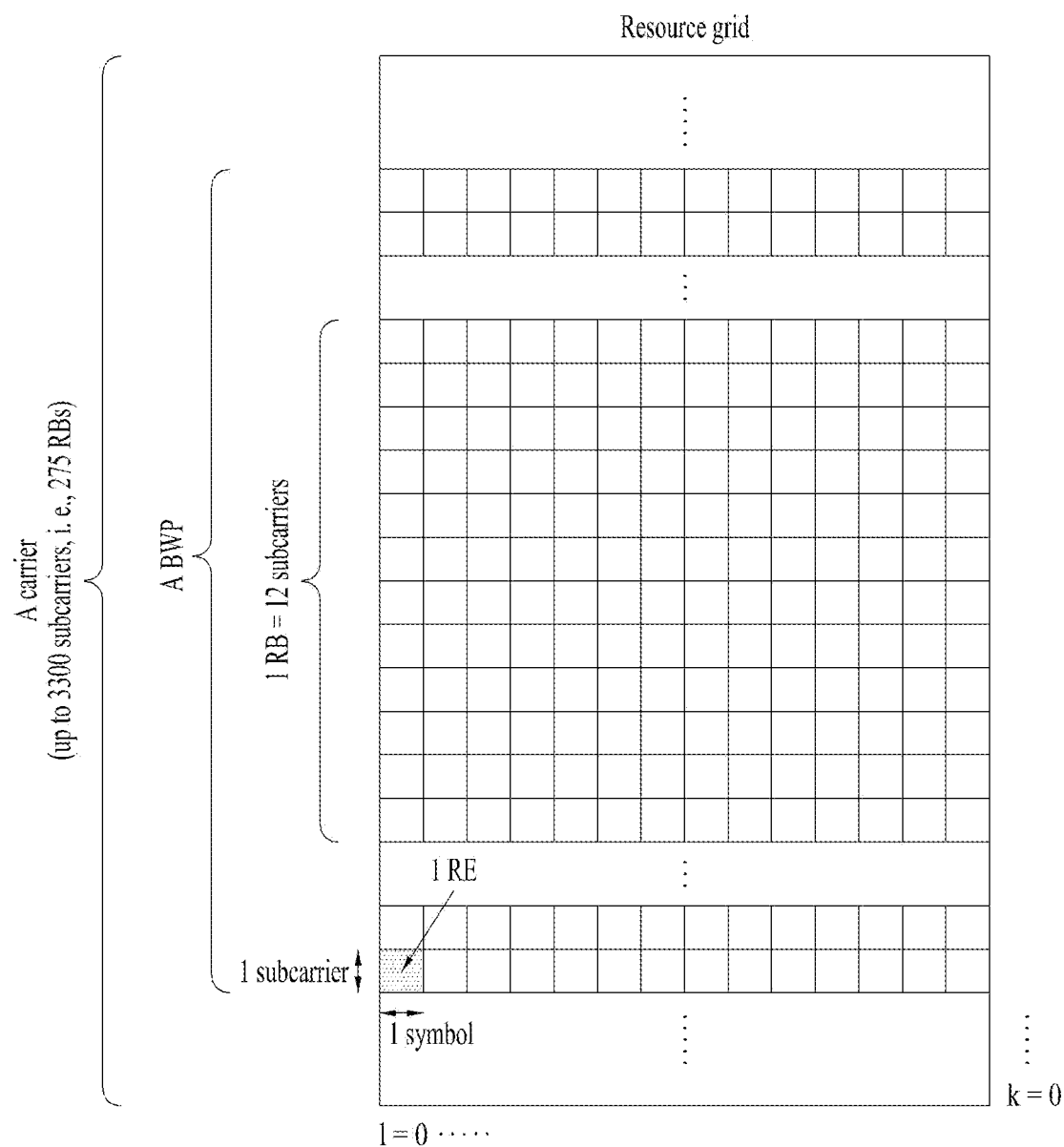
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
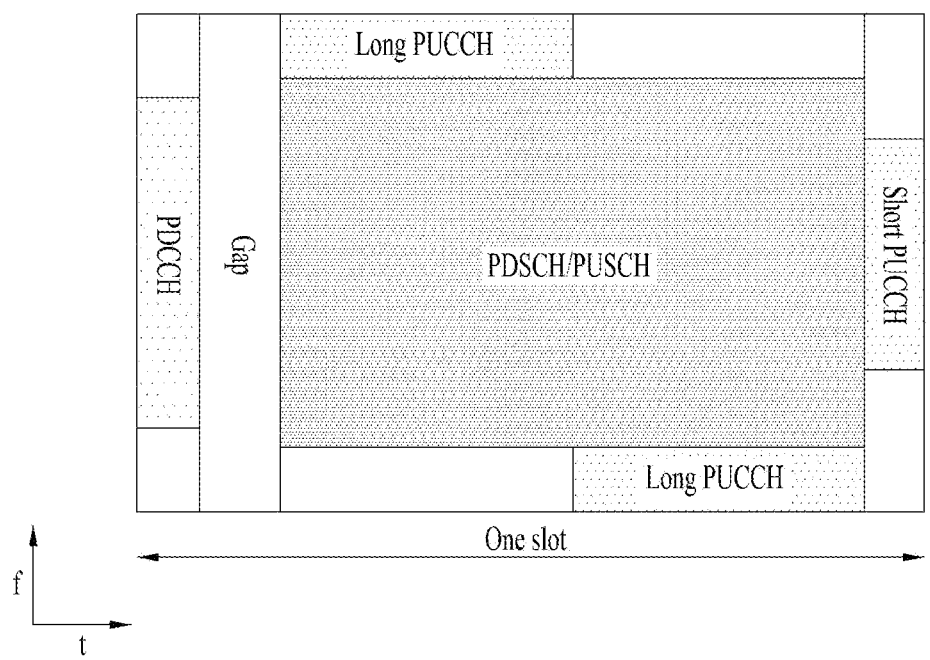
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |

TABLE 4-continued

| Type | Search Space | RNTI | Use Case |
|---|---|---|---|
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.-searchSpaceId: indicates the ID of the SS set.
  controlResourceSetId: indicates a CORESET associated with the SS set.
  monitoringSlotPeriodicityAndOffset: indicates a PDCCH monitoring periodicity (in slots) and a PDCCH monitoring offset (in slots).
  monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
  nrofCandidates: indicates the number of PDCCH candidates (e.g., one of 0, 1, 2, 3, 4, 5, 6, and 8) for each AL={1, 2, 4, 8, 16}.
  searchSpaceType: indicates whether the SS type is CSS or USS.
  DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.
  SR: information used to request UL-SCH resources.
  HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
  CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

FIGS. 5A and 5B illustrate exemplary UL transmission operations of a UE. The UE may transmit an intended packet based on a DG (FIG. 5A) or based on a CG (FIG. 5B).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 6A:
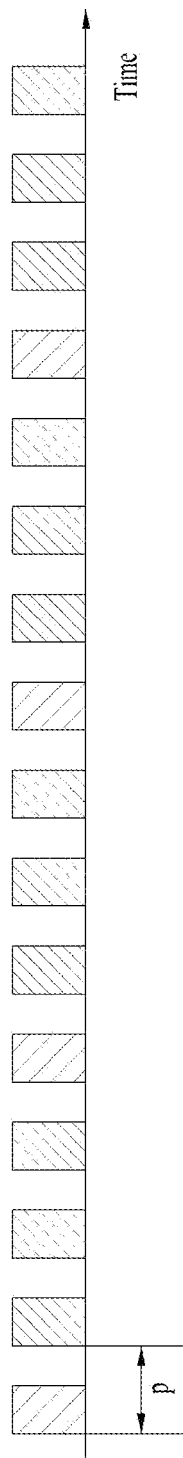
FIGS. 6A and 6B illustrate exemplary repeated transmissions based on a configured grant.
Figure 6B:
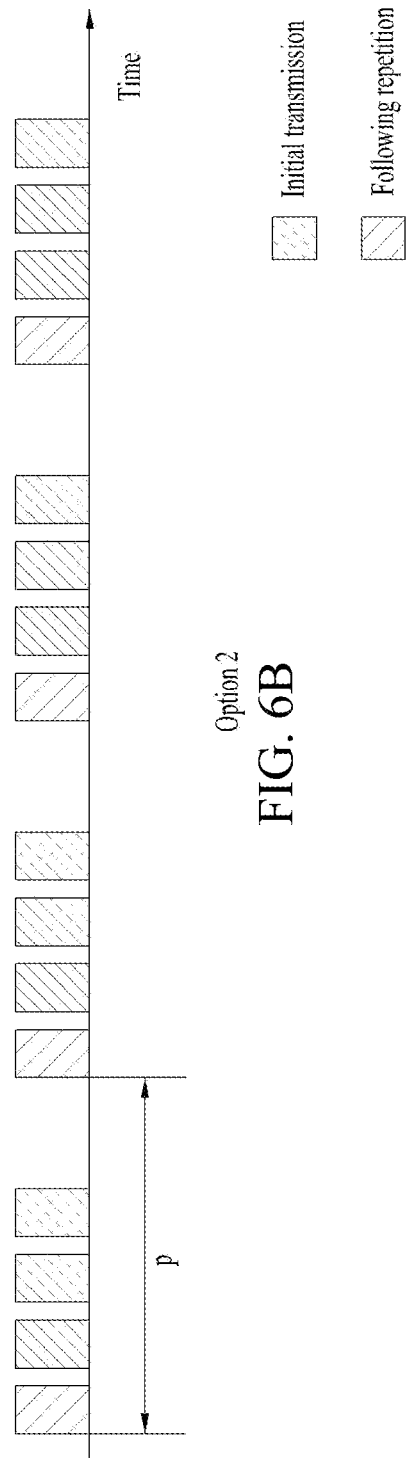

FIGS. 6A and 6B illustrate exemplary repeated transmissions based on a CG.

The UE performs repeated transmissions until one of the following conditions is satisfied:

A UL grant for the same TB is successfully received;
The repetition number of the TB reaches K; and
(In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n–3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

Figure 7A:
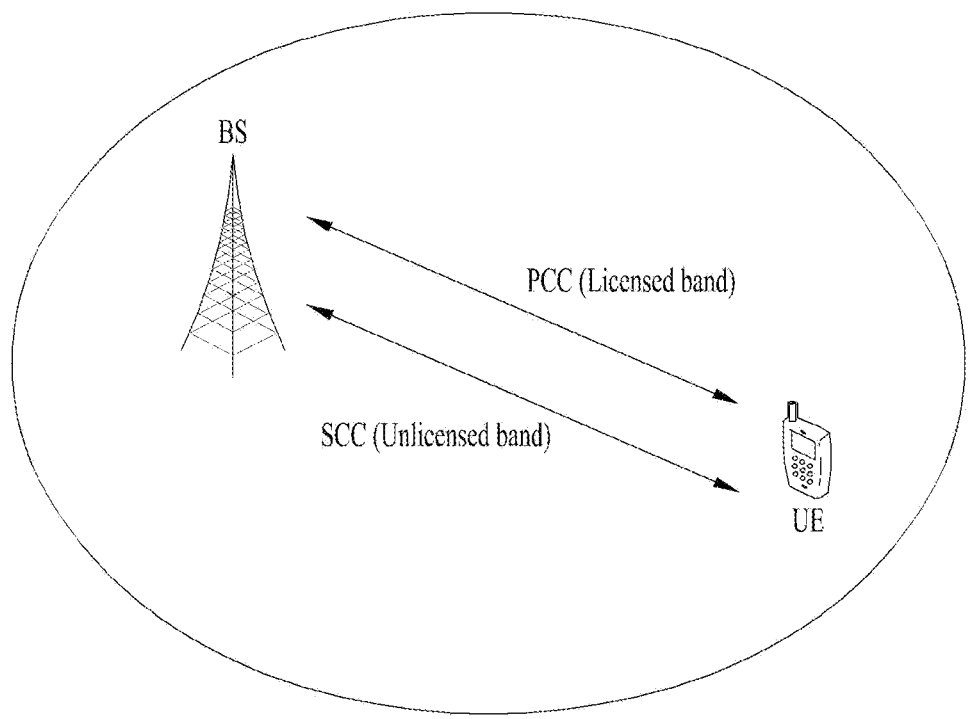
FIGS. 7A and 7B illustrate a wireless communication system supporting an unlicensed band.
Figure 7B:
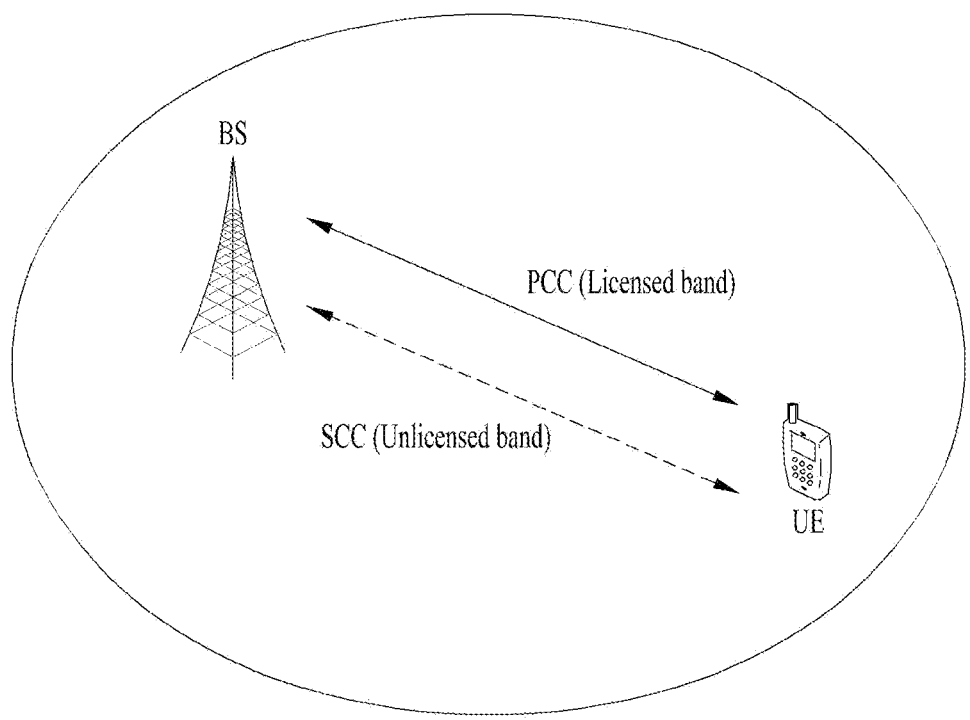

FIGS. 7A and 7B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}=9$ us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT.

The COT may be shared for transmission between the BS and corresponding UE(s).

Specifically, sharing a UE-initiated COT with the BS may mean an operation in which the UE assigns a part of occupied channels through random backoff-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels through random backoff-based LBT (e.g., Cat-3 LBT or Cat-4 LBT) to the UE and the UE performs UL transmission using a remaining COT of the BS, when it is confirmed that a channel is idle by success of LBT after performing LBT without random backoff (e.g., Cat-1 LBT or Cat-2 LBT) using a timing gap occurring before UL transmission start from a DL transmission end timing of the BS.

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 8:
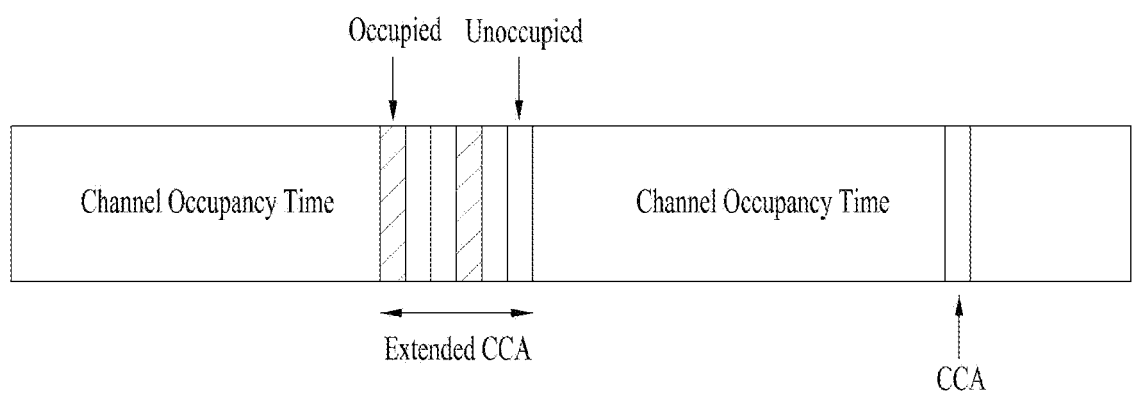
FIG. 8 illustrates an exemplary method of occupying resources in an unlicensed band.

FIG. 8 illustrates an exemplary method of occupying resources in an unlicensed band.

Referring to FIG. 8, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., $X_{thresh}$) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

| | Type | Explanation |
|---|---|---|
| DL | Type 1 CAP | CAP with random backoff time duration spanned by the sensing slots that are sensed to be idle before a downlink transmission(s) is random |
| | Type 2 CAP | CAP without random backoff |
| | Type 2A, 2B, 2C | time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP | CAP without random backoff |
| | Type 2A, 2B, 2C | time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set qE{4, 5, ..., 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects N∈{1, 2, ..., q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

An eNB/gNB or UE of an LTE/NR system should also perform LBT for signal transmission in an unlicensed band (referred to as a U-band for convenience). When the eNB or UE of the LTE/NR system transmits a signal, other communication nodes such as a Wi-Fi node should also perform LBT so as not to cause interference with transmission by the eNB or the UE. For example, in the Wi-Fi standard (801.11ac), a CCA threshold is defined as −62 dBm for a non-Wi-Fi signal and −82 dBm for a Wi-Fi signal. For example, when the non-Wi-Fi signal is received by a station (STA) or an access point (AP) with a power of more than −62 dBm, the STA or AP does not transmit other signals in order not to cause interference.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 9:
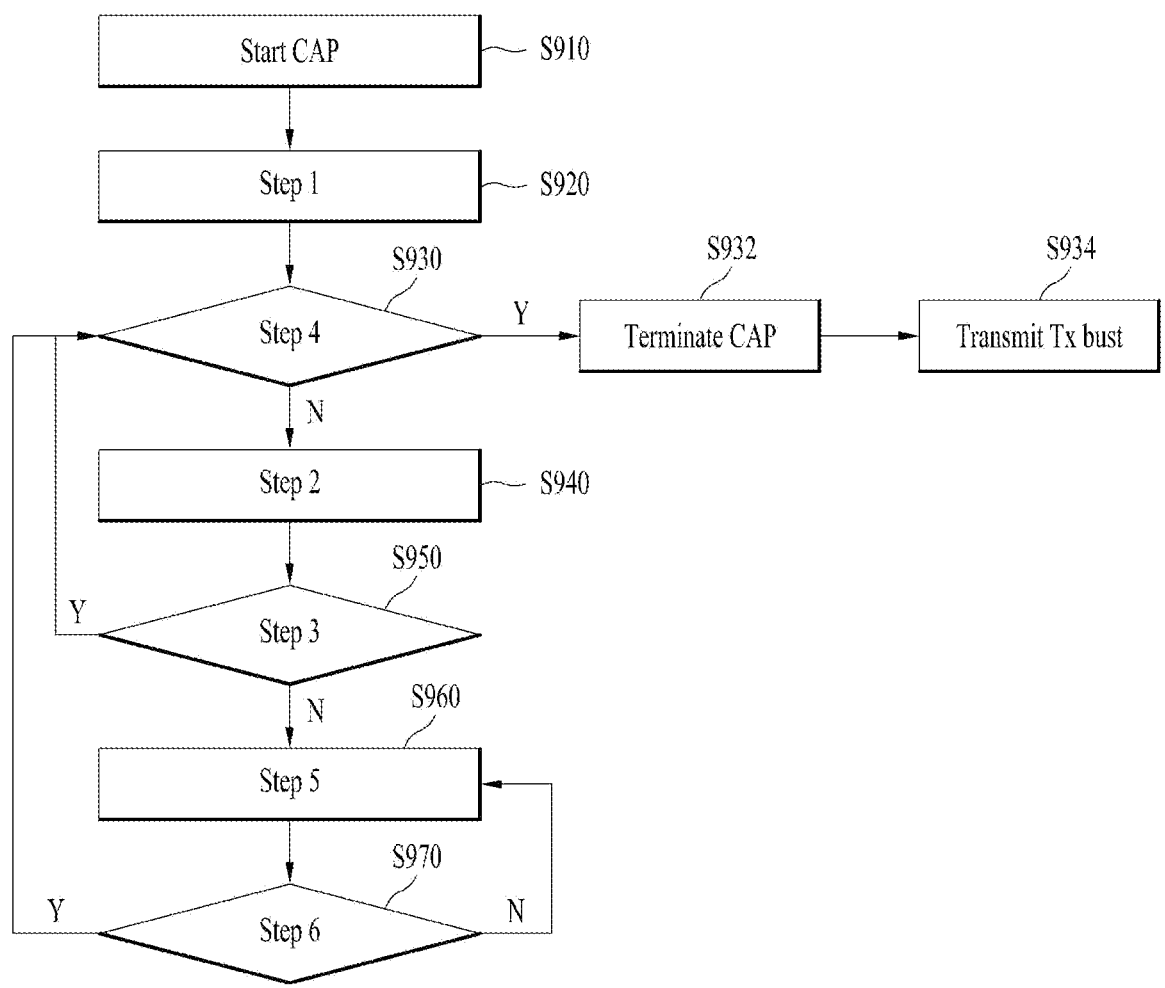
FIG. 9 illustrates an exemplary channel access procedure of a UE for UL signal transmission and/or DL signal transmission in an unlicensed band applicable to the present disclosure.

FIG. 9 illustrates Type 1 CAP among channel access procedures of a UE for UL/DL signal transmission in a U-band applicable to the present disclosure.

First, UL signal transmission in the U-band will be described with reference to FIG. 9.

The UE may sense whether a channel is idle for a sensing slot duration in a defer duration $T_d$. After a counter N is decremented to 0, the UE may perform a transmission (S934). The counter N is adjusted by sensing the channel for additional slot duration(s) according to the following procedure.

Step 1) Set $N=N_{init}$ where $N_{init}$ is a random number uniformly distributed between 0 and $CW_p$, and go to step 4 (S920).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y) (S930), stop CAP (S932). Else (N), go to step 2.

Step 5) Sense the channel until a busy sensing slot is detected within the additional defer duration $T_d$ or all slots of the additional defer duration $T_d$ are sensed as idle (S960).

Step 6) If the channel is sensed as idle for all slot durations of the additional defer duration $T_d$ (Y), go to step 4. Else (N), go to step 5 (S970).

Table 8 illustrates that $m_p$, a minimum CW, a maximum CW, a maximum channel occupancy time (MCOT), and an allowed CW size applied to a CAP vary according to channel access priority classes.

TABLE 8

| Channel Access Priority Class (p) | mp | CWmin,p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 us) immediately followed by $m_p$ consecutive slot durations where each slot duration $T_{sl}$ is 9 us, and $T_f$ includes a sensing slot duration $T_{sl}$ at the start of the 16-us duration. $CW_{min,p} \leq CW_p \leq CW_{max,p}$. $CW_p$ is set to $CW_{min,p}$, and may be updated before Step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 us). $T_{short\_dl}$ includes a duration Tf (=16 us) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$(=16 us). In the Type 2B UL CAP, $T_f$ includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Now, DL signal transmission in the U-band will be described with reference to FIG. 9.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

transmission(s) initiated by the BS, including (i) a unicast PDSCH with user plane data, or (ii) a unicast PDSCH with user plane data and a unicast PDCCH scheduling the user plane data; or transmission(s) initiated by the BS, including (i) only a discovery burst, or (ii) a discovery burst multiplexed with non-unicast information.

Referring to FIG. 9, the BS may first sense whether a channel is idle for a sensing slot duration of a defer duration Td. Next, if a counter N is decremented to 0, transmission may be performed (S934). The counter N is adjusted by sensing the channel for additional slot duration(s) according to the following procedures.

Step 1) Set N=Ninit where Ninit is a random number uniformly distributed between 0 and CWp, and go to step 4 (S920).

Step 2) If N>0 and the BS chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y), stop a CAP (S1232 (? S932)). Else (N), go to step 2 (S930).

Step 5) Sense the channel until a busy sensing slot is detected within the additional defer duration Td or all slots of the additional defer duration Td are sensed to be idle (S960).

Step 6) If the channel is sensed to be idle for all slot durations of the additional defer duration Td (Y), go to step 4. Else (N), go to step 5 (S970).

Table 9 illustrates that mp, a minimum CW, a maximum CW, an MCOT, and an allowed CW size, which are applied to a CAP, vary according to channel access priority classes.

TABLE 9

| Channel Access Priority Class (p) | $m_p$ | CWmin, p | CWmax, p | Tmcot, p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16-μs duration.

CWmin,p<=CWp<=CWmax,p. CWp is set to CWmin,p, and may be updated (CW size update) before Step 1 based on HARQ-ACK feedback (e.g., ratio of ACK signals or NACK signals) for a previous DL burst (e.g., PDSCH). For example, CWp may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

Transmission(s) initiated by the BS, including (i) only a discovery burst, or (ii) a discovery burst multiplexed with non-unicast information, or Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

In a wireless communication system supporting a U-band, one cell (or carrier (e.g., CC)) or BWP configured for the UE may consist of a wideband having a larger BW than in legacy LTE. However, a BW requiring CCA based on an independent LBT operation may be limited according to regulations. If a subband (SB) in which LBT is individually performed is defined as an LBT-SB, a plurality of LBT-SBs may be included in one wideband cell/BWP. A set of RBs constituting an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 10:
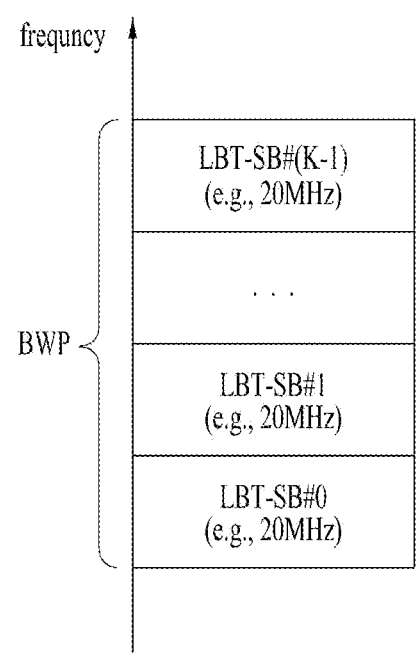
FIG. 10 is a diagram illustrating a plurality of listen-before-talk subbands (LBT-SBs) applicable to the present disclosure.

FIG. 10 illustrates that a plurality of LBT-SBs is included in a U-band.

Referring to FIG. 10, a plurality of LBT-SBs may be included in the BWP of a cell (or carrier). An LBT-SB may be, for example, a 20-MHz band. The LBT-SB may include a plurality of contiguous (P)RBs in the frequency domain and thus may be referred to as a (P)RB set. Although not illustrated, a guard band (GB) may be included between the LBT-SBs. Therefore, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined to be increased as a frequency band becomes higher starting from a low frequency band.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 11:
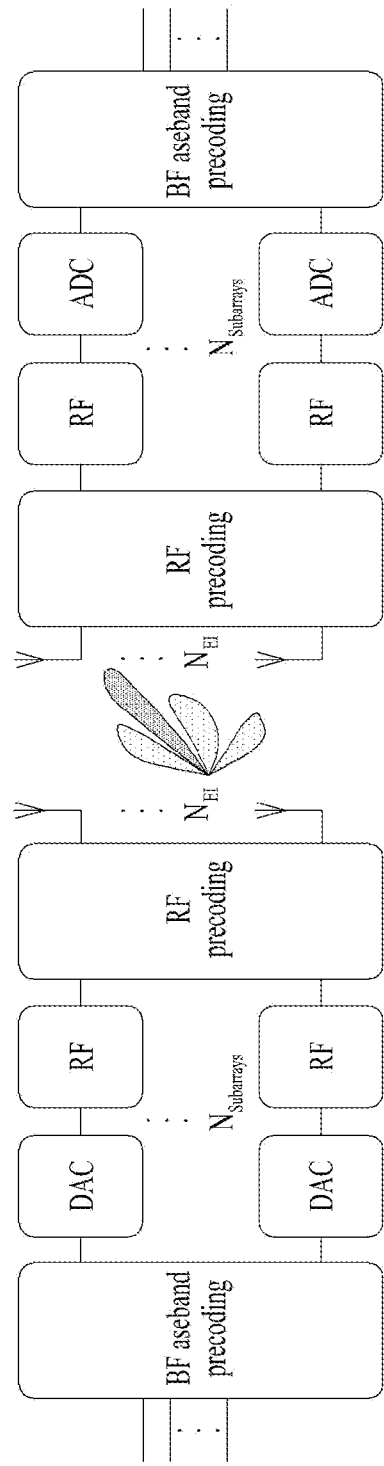
FIG. 11 is a diagram illustrating analog beamforming in the NR system.

FIG. 11 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 12:
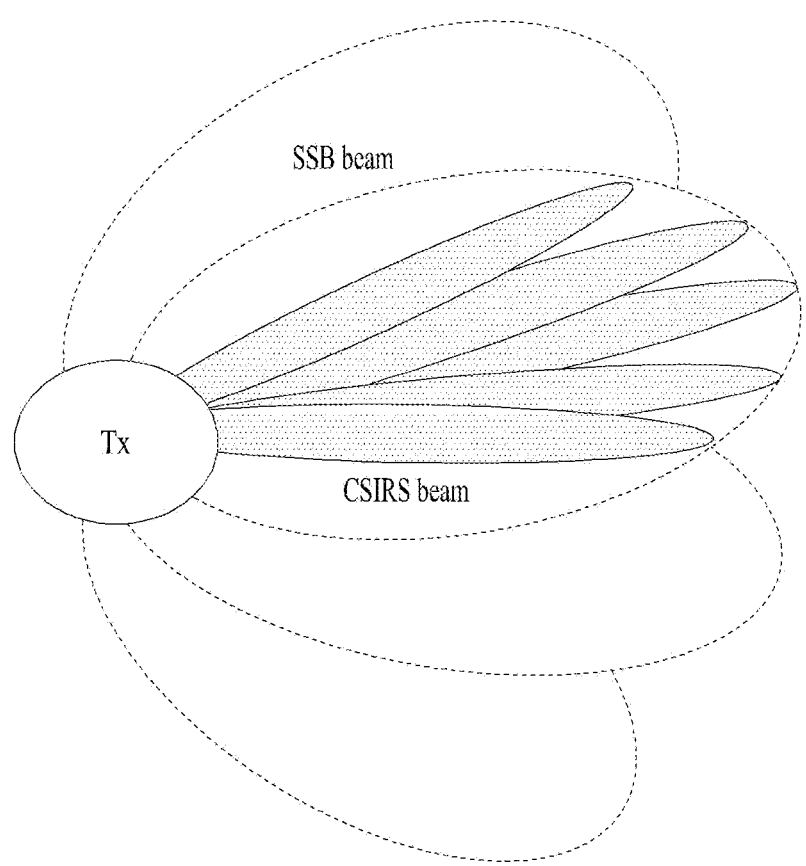
FIGS. 12, 13, 14A, 14B, 15A, 15B, and 16 are diagrams illustrating beam management in the NR system.

FIG. 12 is a diagram illustrating exemplary BF using an SSB and a CSI-RS.

Referring to FIG. 12, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 13:
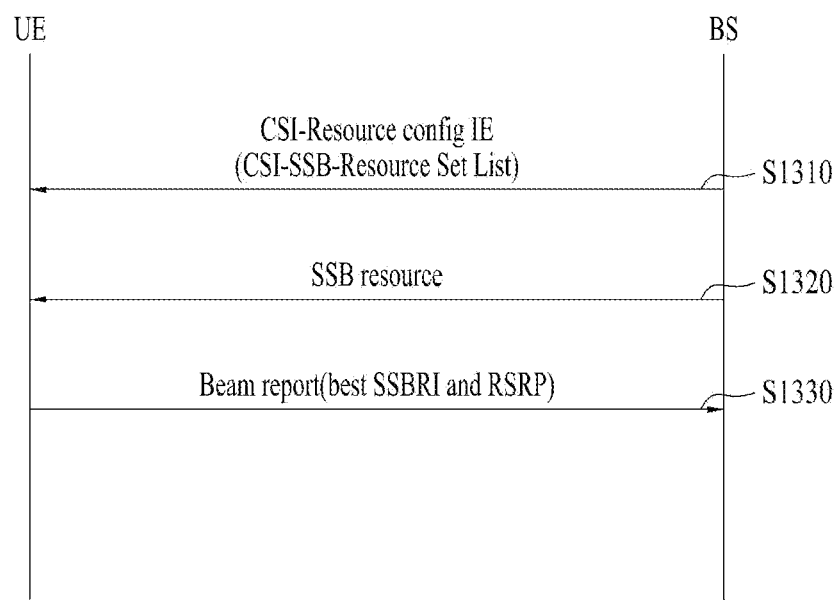

FIG. 13 is a diagram illustrating a signal flow for an exemplary DL BM procedure using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1310). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S1320).

When CSI-RS reportConfig related to an SSBRI and RSRP reporting has been configured, the UE reports a best SSBRI and an RSRP corresponding to the best SSBRI to the BS (S1330). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals 2. DL BM Using CSI-RS The CSI-RS serves the following purposes: i) when Repetition is configured and TRS info is not configured for a specific CSI-RS resource set, the CSI-RS is used for BM; ii) when Repetition is not configured and TRS info is configured for the specific CSI-RS resource set, the CSI-RS is used for a tracking reference signal (TRS); and iii) when either of Repetition or TRS info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 12 illustrates another exemplary DL BM procedure using a CSI-RS.

Figure 14A:
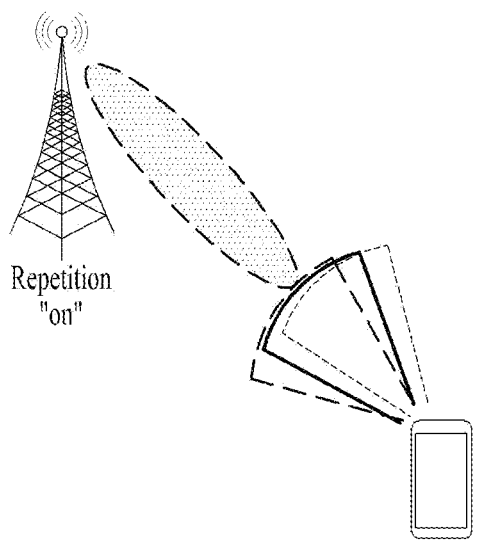
Figure 14B:
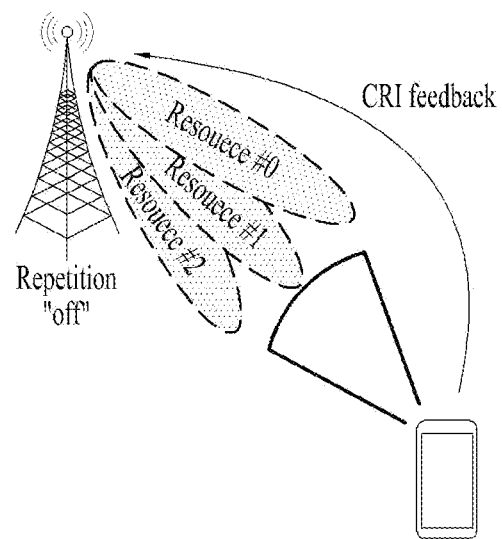

FIG. 14A illustrates an Rx beam refinement process of a UE, and FIG. 14B illustrates a Tx beam sweeping process of a BS. Further, FIG. 14A is for a case in which Repetition is set to 'ON', and FIG. 14B is for a case in which Repetition is set to 'OFF'.

Figure 15A:
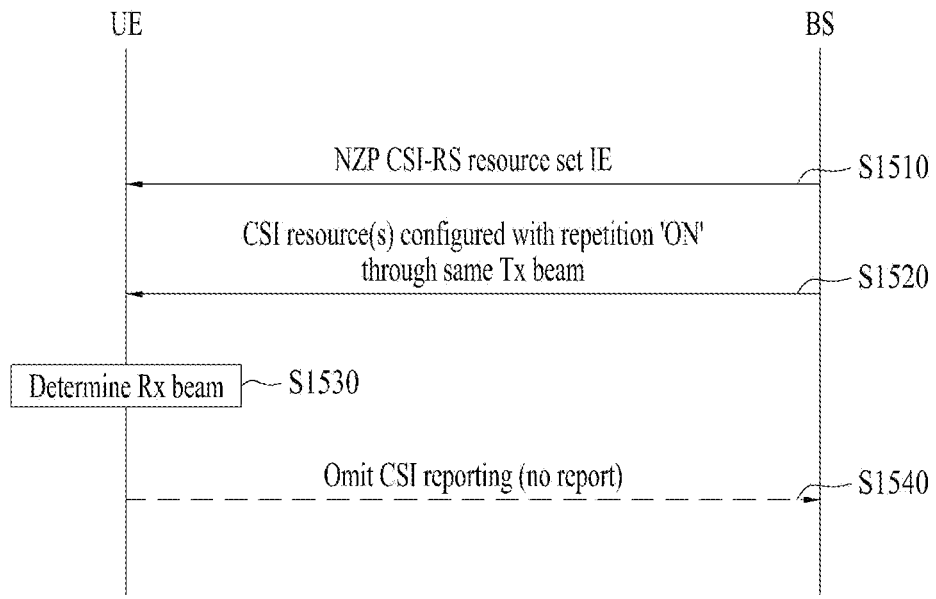

With reference to FIGS. 14A and 15A, an Rx beam determination process of a UE will be described below.

FIG. 15A is a diagram illustrating a signal flow for an exemplary Rx beam determination process of a UE.

The UE receives an NZP CSI-RS resource set IE including an RRC parameter 'Repetition' from a BS by RRC signaling (S1510). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1520).

The UE determines its Rx beam (S1530).

The UE skips CSI reporting (S1540). That is, the UE may skip CSI reporting, when the RRC parameter 'Repetition' is set to 'ON'.

Figure 15B:
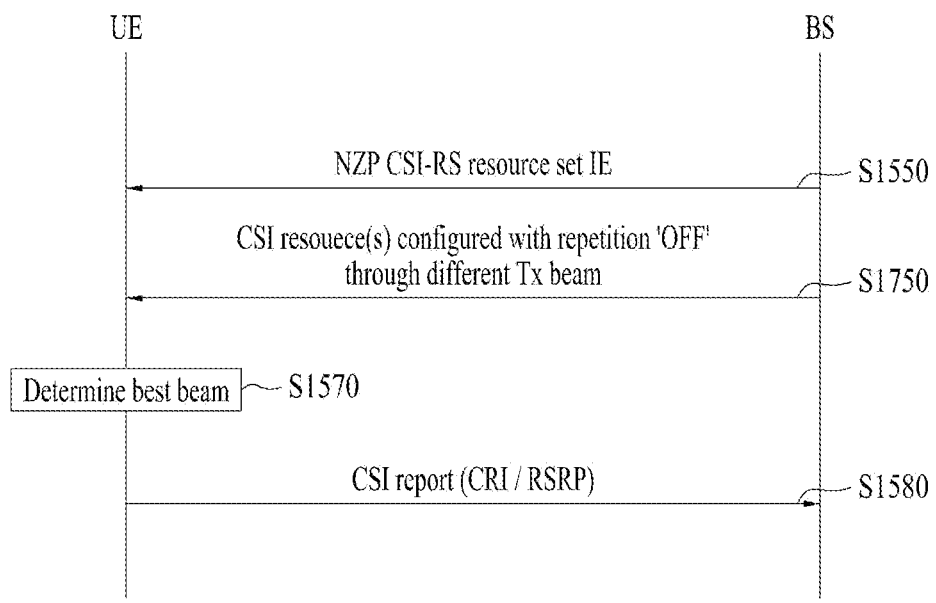

With reference to FIGS. 14B and 15B, a Tx beam determination process of a BS will be described below.

FIG. 15B is a diagram illustrating an exemplary Tx beam determination process of a BS.

A UE receives an NZP CSI-RS resource set IE including an RRC parameter 'Repetition' from the BS by RRC signaling (S1550). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1560).

The UE selects (or determines) a best beam (S1570).

The UE reports the ID (e.g., CRI) of the selected beam and related quality information (e.g., an RSRP) to the BS (S1580). That is, the UE reports a CRI and an RSRP corresponding to the CRI, when a CSI-RS is transmitted for BM.

Figure 16:
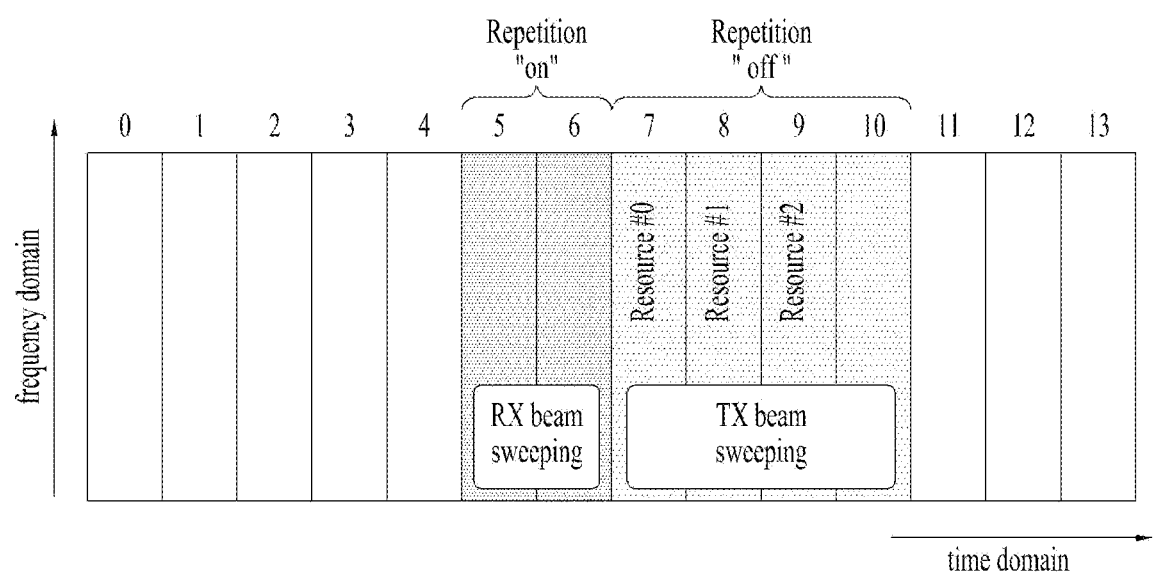

FIG. 16 is a diagram illustrating exemplary resource allocation in the time and frequency domains, which is related to the operation of FIGS. 14A and 14B.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 7 describes an example of a TCI-State IE. The TC-State IE is related to a QCL type corresponding to one or two DL RSs.

TABLE 10

-- ASN1START
-- TAG-TCI-STATE-START
TCI-State ::= SEQUENCE {
  tci-StateId TCI-StateId,
  qcl-Type1 QCL-Info,
  qcl-Type2 QCL-Info OPTIONAL, -- Need R
  ...
}
QCL-Info ::= SEQUENCE {
  cell ServCellIndex OPTIONAL, -- Need R
  bwp-Id BWP-Id OPTIONAL, -- Cond CSI-RS-Indicated
  referenceSignal CHOICE {
    csi-rs NZP-CSI-RS-ResourceId,
    ssb SSB-Index
  },
  qcl-Type ENUMERATED {typeA, typeB, typeC, typeD},
}
-- TAG-TCI-STATE-STOP
-- ASN1STOP In Table 10, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 10, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'gcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

UL BM Procedure

In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM procedure to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K>1 SRS resources, where K is a natural number, and the maximum value of K is indicated by SRS capability.

The UL BM procedure may also be divided into Tx beam sweeping at the UE and Rx beam sweeping at the BS similarly to DL BM.

Figure 17A:
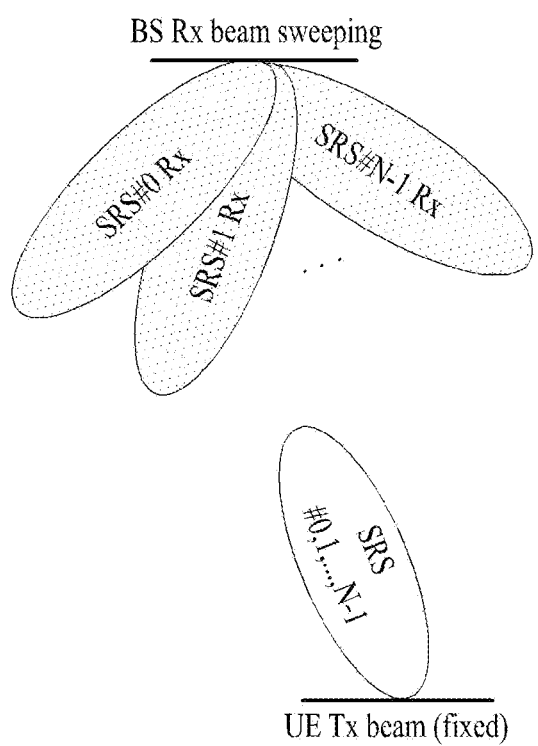
FIGS. 17A to 18 are diagrams illustrating a sounding reference signal applicable to the present disclosure.
Figure 17B:
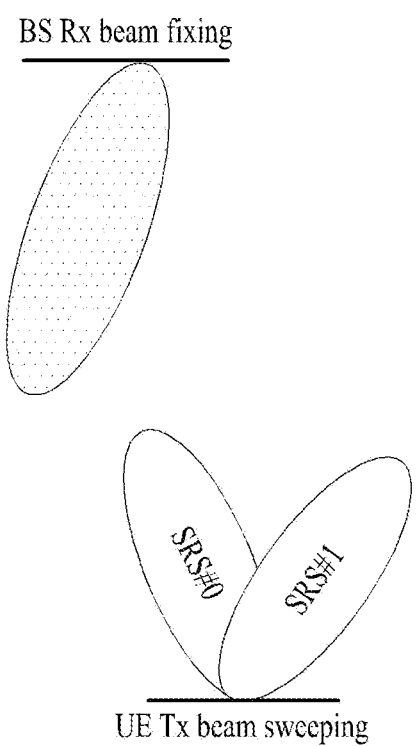

FIGS. 17A and 17B illustrate an example of a UL BM procedure based on an SRS.

FIG. 17A shows a process in which the BS determines Rx beamforming, and FIG. 17B shows a process in which the UE performs Tx beam sweeping.

Figure 18:
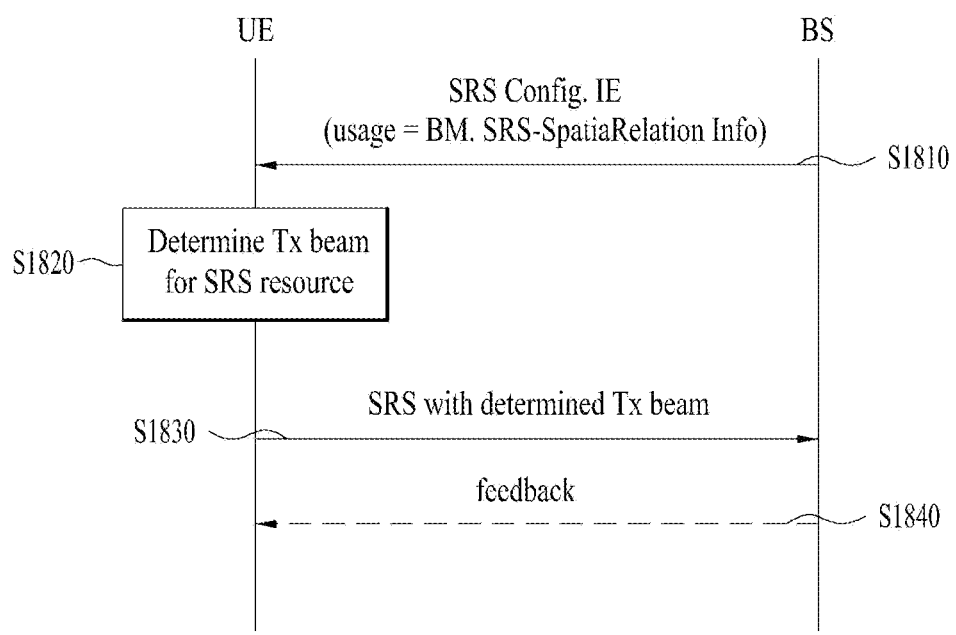

FIG. 18 is a flowchart illustrating an example of a UL BM procedure based on an SRS.

The UE receives RRC signaling (e.g., SRS-Config IE) including a usage parameter (RRC parameter) set to BM from the BS (S1810). The SRS-Config IE is used to configure SRS transmission. The SRS-Config IE includes a list of SRS resources and a list of SRS resource sets. Each SRS resource set refers to a set of SRS resources.

The UE determines Tx beamforming for SRS resources to be transmitted based on SRS-SpatialRelation Info included in the SRS-Config IE (S1820). Here, the SRS-SpatialRelation Info is configured for each SRS resource and indicates whether the same beamforming as that used for an SSB, a CSI-RS, or an SRS is applied for each SRS resource.

If SRS-SpatialRelationInfo is configured for the SRS resources, the same beamforming as that used in the SSB, CSI-RS, or SRS is applied and transmitted. However, if SRS-SpatialRelationInfo is not configured for the SRS resources, the UE randomly determines the Tx beamforming and transmits an SRS based on the determined Tx beamforming (S1830).

For a P-SRS in which 'SRS-ResourceConfigType' is set to 'periodic':

i) If SRS-SpatialRelationInfo is set to 'SSB/PBCH', the UE transmits the corresponding SRS by applying the same spatial domain transmission filter as a spatial domain reception filter used for receiving the SSB/PBCH (or a spatial domain transmission filter generated from the spatial domain reception filter);

ii) If SRS-SpatialRelationInfo is set to 'CSI-RS', the UE transmits the SRS by applying the same spatial domain transmission filter as that used for receiving the CSI-RS; or iii) If SRS-SpatialRelationInfo is set to 'SRS', the UE transmits the corresponding SRS by applying the same spatial domain transmission filter as that used for transmitting the SRS.

Additionally, the UE may or may not receive feedback on the SRS from the BS as in the following three cases (S1840).

i) When Spatial_Relation_Info is configured for all SRS resources in an SRS resource set, the UE transmits the SRS on a beam indicated by the BS. For example, if Spatial_Relation_Info indicates the same SSB, CRI, or SRI, the UE repeatedly transmits the SRS on the same beam.

ii) Spatial_Relation_Info may not be configured for all SRS resources in the SRS resource set. In this case, the UE may transmit while changing the SRS beamforming randomly.

iii) Spatial_Relation_Info may be configured only for some SRS resources in the SRS resource set. In this case, the UE may transmit the SRS on an indicated beam for the configured SRS resources, but for SRS resources in which Spatial_Relation_Info is not configured, the UE may perform transmission by applying random Tx beamforming.

In proposed methods to be described later, a beam may mean an area for performing a specific operation (e.g., LBT or transmission) by concentrating power in a specific direction and/or in a specific space. In other words, the UE or the BS may perform an operation such as LBT or transmission by targeting a specific area (i.e., a beam) corresponding to a specific space and/or a specific direction. Thus, each beam may correspond to each space and/or each direction. In addition, the UE or the BS may use a spatial domain filter corresponding to each space and/or each direction in order to use each beam. That is, one spatial domain filter may correspond to one or more beams. The UE or the BS may perform an operation such as LBT or transmission using the spatial domain filter corresponding to a beam (or space and/or direction) to be used.

For example, the UE or the BS may perform LBT using a spatial domain filter corresponding to an LBT beam in a space and/or a direction for the corresponding LBT beam or perform DL/UL transmission using a spatial domain filter corresponding to a Tx beam in a space and/or a direction for the corresponding Tx beam.

In a high-frequency band of 52.6 GHz or higher, due to a relatively larger path loss than in a low-frequency band, omnidirectional LBT (hereinafter, O-LBT) for performing LBT in all directions, omnidirectional transmission and reception, directional LBT (hereinafter, D-LBT) for performing LBT only in a specific beam direction, and directional transmission and reception, through a technique such as analog beamforming using multiple antennas, may be considered.

In this case, since O-LBT and D-LBT are different in terms of an area and a direction in which LBT is performed, it is necessary to differently configure an energy detection (ED) threshold for determining whether a channel is in an idle or busy state through energy measurement. In addition, since LBT has directionality, a direction in which LBT is performed and the ED threshold are closely related with each other when beams of different directions are multiplexed within a COT obtained through success of D-LBT or when DL/UL beams are used for DL/UL transmission and reception through DL/UL switching. Accordingly, a method of configuring a proper ED threshold and performing multiplexing is needed.

A typical CAP performed for transmission in a U-band is LBT. LBT is a mechanism that prevents collision between transmissions by allowing transmission of a corresponding signal when a noise level is less than a certain level as a result of comparing a surrounding interference level measured by the BS and/or the UE that is to transmit signals with a specific threshold such as an ED threshold.

Figure 19A:
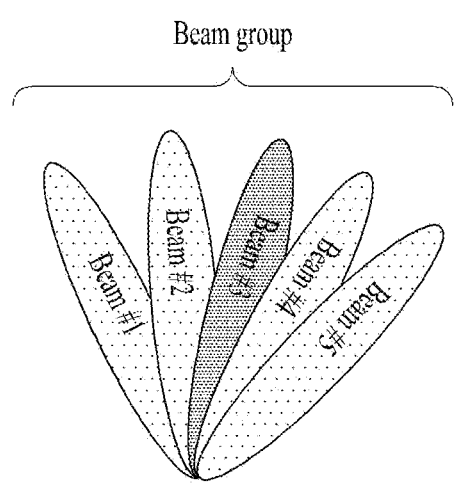
FIGS. 19A and 19B are diagrams illustrating beam-based LBT and group-based LBT according to an embodiment of the present disclosure.
Figure 19B:
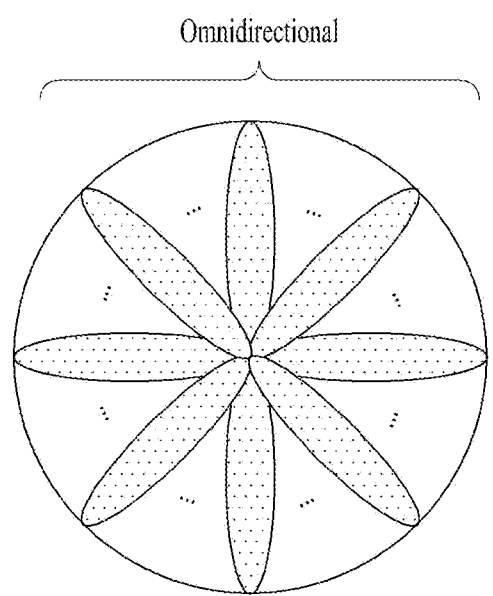

FIGS. 19A and 19B illustrate exemplary D-LBT and exemplary O-LBT.

FIG. 19A illustrates D-LBT including specific beam direction LBT and/or beam group unit LBT, and FIG. 19B illustrates O-LBT.

In a legacy NR-U system (e.g., Rel-16 NR-U), a DL/UL signal/channel has been transmitted if it is determined that a channel is idle by performing a CAP (i.e., LBT) as described with reference to FIG. 9. On the other hand, in the legacy NR-U system, an LBT band has been aligned with LBT bands of other RATs for coexistence with other RATs (e.g., Wi-Fi), and the CAP (i.e., LBT) has been performed omnidirectionally. In other words, non-directional LBT has been performed in the legacy NR-U system.

However, Rel-17 NR-U for transmitting the DL/UL signal/channel in a higher band (e.g., a band of 52.6 GHz or higher) than a U-band of 7 GHz used in the legacy NR-U system may utilize D-LBT which transmits the signal/channel by concentrating energy in a specific beam direction in order to overcome path loss larger than in the band of 7 GHz used in the legacy system. That is, in Rel-17 NR-U, the DL/UL signal/channel may be transmitted over wider coverage by reducing path loss through D-LBT, and efficiency may be improved even in coexistence with other RATs (e.g., WiGig).

Referring to FIG. 19A, when a beam group consists of beams #1 to #5, performing LBT based on beams #1 to #5 may be referred to as beam group unit LBT. In addition, performing LBT through any one (e.g., beam #3) of beams #1 to #5 may be referred to as specific beam direction LBT. In this case, beams #1 to #5 may be continuous (or adjacent) beams but may also be discontinuous (or non-adjacent) beams. Further, the number of beams included in the beam group is not necessarily plural, and a single beam may form one beam group.

FIG. 19B illustrates O-LBT. When omnidirectional beams constitute one beam group and perform LBT in units of the corresponding beam group, this may be interpreted as performing O-LBT. In other words, if beams of all directions, i.e., omnidirectional beams which are a set of beams covering a specific sector in a cell, are included in one beam group, this may mean O-LBT.

In other words, in the case of a high frequency band, coverage may be limited due to significant path loss. In order to overcome such a coverage problem, a multi-antenna technique may be used. For example, narrow-beam transmission in which a signal is transmitted by concentrating energy in a specific direction, rather than omnidirectional transmission, may be performed.

In a high-frequency U-band, along with a CAP such as LBT described above, beam-based transmission combined therewith needs to be considered. For example, in order to perform D-LBT in a specific direction, D-LBT may be performed only in the corresponding direction or LBT may be performed in units of a beam group including a beam of the corresponding direction. Then, if a channel is determined to be idle, transmission may be performed. Here, the beam group may include a single beam or a plurality of beams. If the beam group includes omnidirectional beams, D-LBT may be extended to O-LBT.

Since beam-based transmission described above transmits a signal by concentrating energy in a specific direction, interference affecting neighboring BSs/UEs (except for nodes located in a transmission direction) may be relatively small as compared with omnidirectional transmission. That is, it may be considered that spectrum sharing is naturally formed in beam-based transmission because beam-based transmission causes interference only in a specific direction. Therefore, if a specific condition is satisfied, a channel access opportunity may be increased and system performance may be improved by performing beam-based transmission without performing LBT.

Information about a beam group in which each beam is included and information about at least one beam included in each beam group may be configured, and a CWS and a backoff counter value may be separately managed for each individual beam or each individual beam group. Therefore, when performing LBT, an event such as CWS resetting/increase or backoff counter decrease may affect each beam and a beam group in which each beam is included. For example, if feedback for data transmitted through LBT in a specific beam direction is NACK and thus a CWS value for the corresponding beam direction is increased, the increase of the CWS value is also reflected in the CWS managed by the beam group in which the corresponding beam is included, so that a CWS value for the beam group may be increased. On the other hand, even if the CWS value for the corresponding beam direction is increased, the CWS value for the beam group may be independently managed without affecting the beam group including the corresponding beam. In addition, the backoff counter value managed based on each beam or each beam group may also be configured as described above such that the back-off counter value for each beam and the back-off counter value for each beam group are independently managed or depend on each other to affect each other.

Beam-based LBT and beam group-based LBT may be interchanged under a specific condition. In the case of UL transmission, the BS may indicate an LBT type to be used among the two LBT types (i.e., beam-based LBT and beam group-based LBT). In the case of CG UL transmission, when configuring resources for CG UL transmission, an LBT type to be performed on each resource may be configured as well. If delay-sensitive data transmission is indicated together with LBT in a specific beam direction, data may not be transmitted due to LBT failure. Therefore, a channel access opportunity may be increased by allocating a plurality of LBT opportunities to other beams in a beam group in which the corresponding beam is included.

In this disclosure, a beam-based LBT procedure or a beam group-based LBT procedure may basically mean a random backoff-based Cat-3 or Cat-4 LBT. In beam-based LBT, energy measured by performing carrier sensing in a specific direction is compared with an ED threshold. Next, if the energy measured by performing carrier sensing is lower than the ED threshold, a channel in the corresponding beam direction may be considered to be idle and, if the energy measured through carrier sensing is higher than the ED threshold, the channel in the corresponding beam may be considered to be busy.

The beam group-based LBT procedure is to perform the above-described LBT procedure in all beam directions included in a beam group and to transmit signals when LBT is successful by performing a random backoff-based LBT procedure as a representative using a corresponding beam, similar to multi-CC LBT when a beam (e.g., a representative beam) of a preconfigured/indicated specific direction is present in a beam group and performing non-random back-off-based Cat-1 or Cat-2 LBT for the remaining beams included in the beam group. In the beam group-based LBT procedure, according to the regulation of each country/region, the random backoff-based LBT procedure may be performed through the representative beam, and no-LBT may be performed on the remaining beams included in the beam group to transmit signals through each of the remaining beams.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

A definition related to QCL described in this disclosure may follow one of definitions related to QCL described above. Similarly, the definition of the QCL concept may be modified to a form in which co-location transmission between antenna ports for which QCL assumption is made may be assumed (e.g., the UE may assume that the antenna ports transmit signals at the same transmission point). The scope of the present disclosure includes such similar modified examples. For convenience of description, the above QCL-related definitions are used interchangeably in the present disclosure.

By the above definition, the UE may not assume that "non-quasi-co-located (NQC) antenna ports" have the same large-scale channel properties therebetween. That is, in this case, a typical UE receiver should perform independent processing for each configured NQC antenna port in regard to timing acquisition and tracking, frequency offset estimation and compensation, delay estimation, and Doppler estimation. The UE may advantageously perform the following operations for antenna ports for which QCL may be assumed.

In regard to delay spread and doppler spread, the UE may apply the same power-delay-profile, delay spread, Doppler spectrum, and Doppler spread estimation results for one antenna port to a Wiener filter, etc. used for channel estimation for another antenna port.

In regard to frequency shift and received timing, after performing time and frequency synchronization for one antenna, the UE may apply the same synchronization to demodulation for another antenna port.

In regard to average received power, the UE may average RSRP measurements for a plurality of antenna ports.

Meanwhile, when beam reciprocity is established between DL beams and UL beams, either a procedure for determining a DL beam pair or a procedure for determining a UL beam pair may be omitted. This may be equally applied even when beam correspondence is established.

Here, "beam reciprocity (or beam correspondence) is established" may mean that it is assumed that a BS Tx beam and a BS Rx beam coincide and a UE Tx beam and a UE Rx beam coincide in communication between the BS and the UE. Here, the BS Tx beam and the BS Rx beam may mean a DL Tx beam and a DL Rx beam, respectively, and the UE Tx beam and the UE Rx beam may mean a UL Tx beam and a UL Rx beam, respectively. Here, the Tx beam may mean a transmission beam, and the Rx beam may mean a reception beam.

Figure 20:
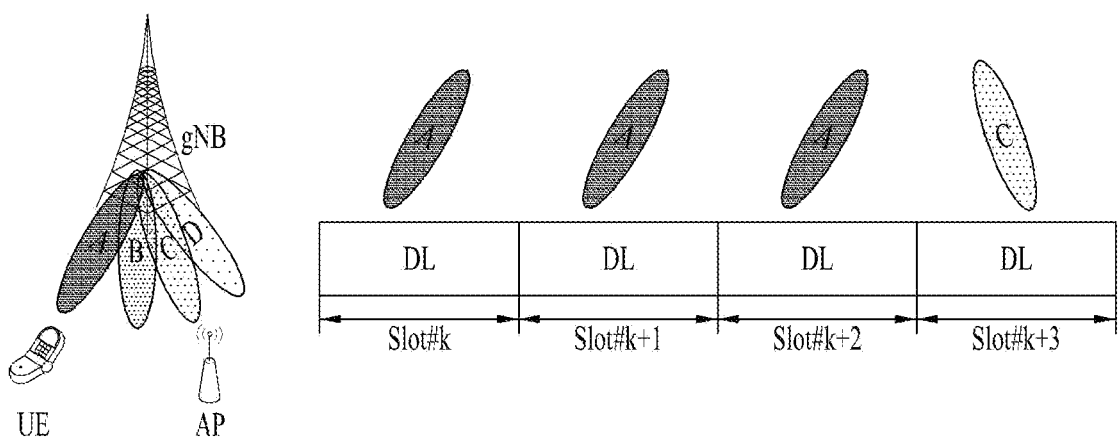
FIG. 20 is a diagram illustrating a problem occurring while beam-based LBT is performed according to an embodiment of the present disclosure.

It may be desirable for the following reasons to configure all DL signals/channels (or all UL signals/channels) included in one Tx burst as signals/channels having a spatial (partial) QCL relation. For example, in transmitting a Tx burst consisting of a total of 4 slots after the BS succeeds in LBT as illustrated in FIG. 20, the BS may transmit a signal in 3 slots in a beam direction of A and then transmit a signal in the fourth slot in a beam direction of C.

However, while the BS transmits a signal in the beam direction of A, a Wi-Fi AP coexisting in a corresponding U-band may fail to detect the signal transmitted in the beam direction of A and determine that a channel is idle. After succeeding in LBT, the Wi-Fi AP may start to transmit and receive a signal. In this case, if the BS transmits a signal in the beam direction of C starting from slot #k+3, the signal may act as interference with a corresponding Wi-Fi signal. Thus, when the BS that has performed transmission in the direction of A performs transmission by switching a beam direction without additional LBT, the BS may cause interference with another coexisting wireless node. Therefore, it may be desirable not to switch a Tx beam direction of a Tx burst that is transmitted after the BS succeeds in LBT.

In the NR system, a method of signalling beam information to be used by the UE during UL transmission and reception by associating a DL signal and a UL signal is under consideration. For example, if there is a beam direction generated by the UE on a channel state information reference signal (CSI-RS) resource by associating the CSI-RS resource and a sounding reference signal (SRS) resource, when the UE transmits an SRS on the SRS resource linked with the CSI-RS resource (or when the UE transmits a PUSCH scheduled through a UL grant through which the SRS resource linked with the CSI-RS resource is signalled), the UE may transmit the UL signal using a Tx beam corresponding to a CSI-RS Rx beam. In this case, the relationship between a specific Rx beam and a specific Tx beam may be configured by the UE in implementation when there is beam correspondence capability of the UE. Alternatively, the relationship between the specific Rx beam and the specific Tx beam may be configured by training of the BS and the UE when there is no beam correspondence capability of the UE.

Therefore, when an association relationship between the DL signal and the UL signal is defined, COT sharing may be allowed between a DL Tx burst consisting of DL signals/channels in a spatial (partial) QCL relation with the DL signal and a UL Tx burst consisting of UL signals/channels in a spatial (partial) QCL relation with the UL signal associated with the DL signal.

Here, the UL signals/channels may include at least one or more of the following signals/channels:
an SRS, a demodulation reference signal (DMRS) for a PUCCH, a DMRS for a PUSCH, a PUCCH, a PUSCH, or a PRACH Here, the DL signals/channels may include at least one or more of the following signals/channels:
a PSS, an SSS, a DMRS for a PBCH, a PBCH, a tracking reference signal (TRS), a CSI-RS for tracking, a CSI-RS for CSI acquisition, a CSI-RS for radio resource management (RRM) measurement, a CSI-RS for BM, a DMRS for a PDSCH, a DMRS for a PDCCH (or a control resource set (CORESET) in which the PDCCH may be transmitted), a PDSCH, or a signal introduced for the purpose of tracking, (fine) time/frequency synchronization, coexistence, power saving, or frequency reuse factor=1, arranged in front of a Tx burst, as a modified signal of the above-listed signals or related signals or as a newly introduced signal Meanwhile, each proposed method to be described later may be combined with other proposed methods and be applied together therewith unless each proposed method conflicts with other proposed methods.

As described above, in the U-band, signal transmission should follow a rule of "LBT" by a CCA operation. That is, a transmitter may perform signal transmission when a signal equal to or greater than a specific CCA threshold is not detected during a specific sensing period.

Considering the CCA operation, first, since each BS (or TRP) or UE should always perform "energy sensing" prior to a transmission operation, a definition or a restriction condition of an operation similar to above energy sensing needs to be specified even from the viewpoint of an Rx antenna of the BS/UE. This is because an energy sensing result may be different depending on implementation, such as whether or not the BS receives a signal through a sectored antenna or whether or not the BS receives a signal by applying a specific Rx beam pattern.

Accordingly, for example, when a gNB Rx beam pattern applied during energy sensing and a Tx beam pattern during transmission after CCA are differently applied, a beam area in which CCA is determined and a beam area of a Tx signal are different, so that there is a possibility of causing large interference with surrounding communication.

Prior to describing proposed methods, the overall operation processes of the UE and the BS for implementing the proposed methods to be described will now be described.

Figure 21:
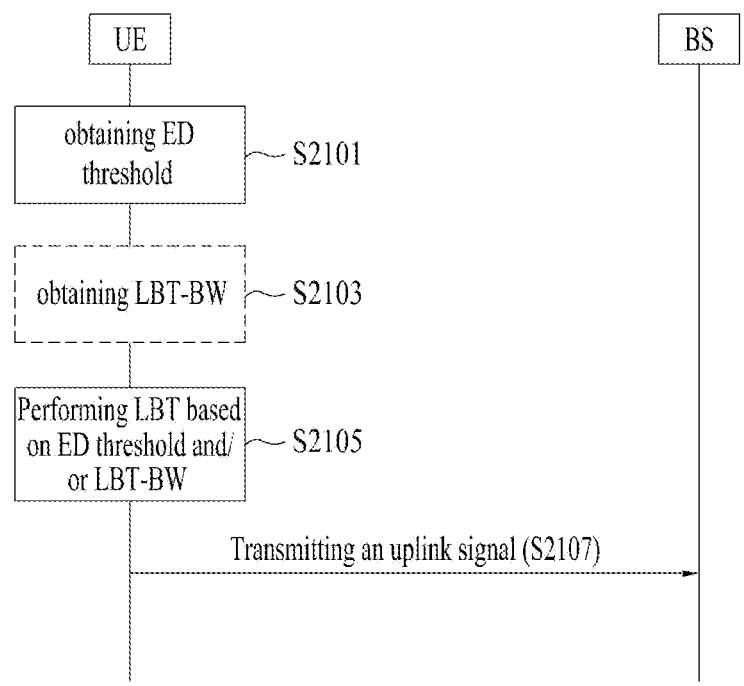
FIGS. 21 and 22 are diagrams illustrating overall operation processes of a UE and a BS according to an embodiment of the present disclosure.

FIG. 21 illustrates a method for the UE to transmit a UL signal according to at least one proposed method of the present disclosure.

Referring to FIG. 21, the UE may obtain an ED threshold for energy sensing (S2101). For example, the UE may obtain the ED threshold based on at least one of [Proposed Method #1], [Proposed Method #2], or [Proposed Method #4]. However, the UE may also obtain the ED threshold by the prior art and methods other than the proposed methods according to the present disclosure.

The UE may obtain an LBT-BW (S2103). For example, the UE may obtain the LBT-BW based on [Proposed Method #3]. However, a method of obtaining the LBT-BW according to [Proposed Method #3] may be omitted. If the method of obtaining the LBT-BW according to [Proposed Method #3] is omitted, the UE may perform LBT based on an LBT-BW (e.g., 20 MHz) according to the prior art or perform LBT using a configured BWP size as an LBT-BW unit.

The UE may perform LBT based on the obtained ED threshold and/or LBT-BW (S2105). In addition, upon succeeding in LBT, the UE may transmit the UL signal to the BS (S2107). For example, the UE may perform LBT based on [Proposed Method #2] for multiplexed Tx beams and transmit the UL signal.

Figure 22:
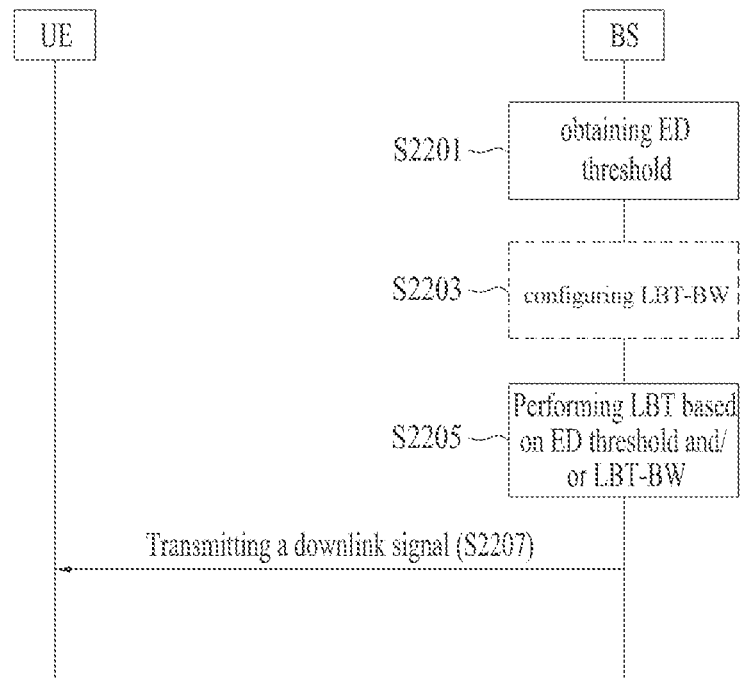

FIG. 22 illustrates a method for the BS to transmit a DL signal according to at least one proposed method of the present disclosure.

Referring to FIG. 22, the BS may obtain an ED threshold for energy sensing (S2201). For example, the BS may acquire the ED threshold based on at least one of [Proposed Method #1], [Proposed Method #2], or [Proposed Method #4]. However, the BS may also obtain the ED threshold by the prior art and methods other than the proposed methods according to the present disclosure.

The BS may acquire an LBT-BW (S2203). For example, the BS may configure the LBT-BW based on [Proposed Method #3]. However, a method of configuring the LBT-BW according to [Proposed Method #3] may be omitted. If the method of configuring the LBT-BW according to [Proposed Method #3] is omitted, the BS may perform LBT based on an LBT-BW (e.g., 20 MHz) according to the prior art or perform LBT using a configured BWP size as an LBT-BW unit.

The BS may perform LBT based on the obtained ED threshold and/or LBT-BW (S2205). Upon succeeding in LBT, the BS may transmit the DL signal to the UE (S2207). For example, the BS may perform LBT for multiplexed Tx beams based on [Proposed Method #2] and transmit the DL signal.

Hereinafter, the proposed methods of the present disclosure for solving the above-described problems will be described.

[Proposed Method #1]

When ED measurement-related requirements of the UE are defined (e.g., in the RAN4 standard), an ED threshold may be configured.

1. Embodiment #1-1

A method of defining an ED measurement type or an ED measurement class for a specific ED threshold. In this case, the ED threshold may be different according to the ED measurement type/class.

2. Embodiment #1-2

The UE may previously report an ED measurement capability thereof to the BS. The BS may indicate/configure a spatial relation between an LBT beam and a specific RS to/for the UE based on information about the ED measurement capability and indicate/configure an ED measurement type/class and an ED threshold of D-LBT together with UL scheduling information.

In this case, the ED threshold may be differently configured for/indicated to the UE according to a DL signal which is in a spatial relation with a UL signal/channel to be transmitted by the UE.

A detailed description of [Proposed Method #1] will now be given.

A CCA range in the case of performing D-LBT through a specific LBT beam (e.g., Rx beam pattern) using a specific directional antenna should not exceed an interference range in which Tx beam(s) affect interference. In addition, the interference range in which the Tx beam(s) affect interference should be considered when the CCA range and an EDT (e.g., ED threshold) of D-LBT are configured. Meanwhile, ED measurement-related requirements of the UE may be defined in a standard document such as RAN4, and the ED measurement type/class may be defined according to a specific ED threshold. Alternatively, when Tx powers or LBT BWs of the UE are equal and the sizes of LBT beams (e.g., widths of the beams) are different so that different ED measurement types/classes are defined, different ED thresholds may be configured according to the ED measurement types/classes.

The UE may previously report the information about the ED capability thereof to the BS, and the BS may indicate the ED measurement type/class and the ED threshold of the D-LBT together with the UL scheduling information based on the information about the ED capability of the UE.

The above-described ED measurement-related requirements of the UE may be defined as a shape of a beam pattern when the UE performs UL transmission through antennas thereof. For example, when UL transmission in a space of a virtual sphere shape occupies an area A in a virtual sphere and D-LBT may be performed through an area B including the area A, the ED measurement type/class may be defined based on the size of an area B-A (i.e., the difference between the area B and the area A).

As another example, an ED threshold type 1 (or ED threshold class 1) for the same specific ED threshold may be a wide beam in which the beam width of an LBT beam (e.g., Rx beam pattern) is wider than the beam width of a Tx beam. In this case, the wide beam may mean a beam in which the width of a main lobe in a beam pattern is relatively large.

An ED threshold type 2 (or ED threshold class 2) may be defined in the ED measurement requirements as a relatively narrow beam in which the difference between the beam width of an LBT beam (e.g., Rx beam pattern) and the beam width of a Tx beam is not large. Here, the narrow beam may mean a beam in which the width of a main lobe in a beam pattern is relatively small and the difference between the width of the main lobe of the Tx beam and the width of a side lobe in the beam pattern is not large (e.g., difference equal to or less than a certain value). For example, when beam correspondence is established, a Tx beam direction corresponding to a CSI-RS Rx beam may be relatively narrow relative to a Tx beam direction corresponding to an SSB Rx beam. In other words, when beam correspondence is established, the Tx beam direction corresponding to the CSI-RS Rx beam may be a relatively wide beam compared to the Tx beam direction corresponding to the SSB Rx beam.

According to the capability of the UE, some UEs may support both the ED threshold type 1 and the ED threshold type 2 (or ED threshold class 1 and ED threshold class 2) and other UEs may support only ED measurement of a specific type/class.

The BS may configure an LBT beam and a specific RS as a spatial relation based on the information about capability for the ED measurement type (or class) reported by the UE and indicate to/configure for the UE the ED measurement type (or class) and the ED threshold of D-LBT during UL scheduling.

For example, the case in which a DL RS having a spatial relation with an LBT beam is a CSI-RS may be configured as an ED measurement type 1 (or class 1), and the case in which the DL RS having a spatial relation with the LBT beam is an SSB may be configured as ED measurement type 2 (or class 2). In addition, the case in which the DL RS having a spatial relation with the LBT beam is an SRS may be configured as an ED measurement type 3 (or class 3).

After configuring the ED measurement type (or class) as described above, when the BS performs UL scheduling for the UE, the BS may indicate a direction of the LBT beam in which D-LBT for each UL channel/signal is to be performed and the ED measurement type (or class). In addition, the ED threshold may be differently configured for/indicated to the UE according to a DL signal which is in a spatial relation with a UL signal/channel to be transmitted by the UE.

[Proposed Method #2]

The BS and the UE may configure an ED measurement type (or class) and an ED threshold in consideration of directions and an interference range of Tx beam(s) to be transmitted within a COT.

1. Embodiment #2-1

An ED measurement type (or class) and an ED threshold covering a total interference range of one or more Tx beams to be transmitted through spatial division multiplexing (SDM) within the COT may be configured.

(1) The ED threshold may be configured/indicated based on a Tx beam having {largest effective isotropic radiated power (EIRP), average EIRP, or minimum EIRP} among one or more Tx beams to be transmitted through SDM within the COT.

(2) D-LBT may be simultaneously performed on one or more Tx beams using a single LBT beam that covers an interference range of one or more Tx beams to be transmitted through SDM within the COT. In this case, the single LBT beam may be a relatively wide beam.

Figure 23A:
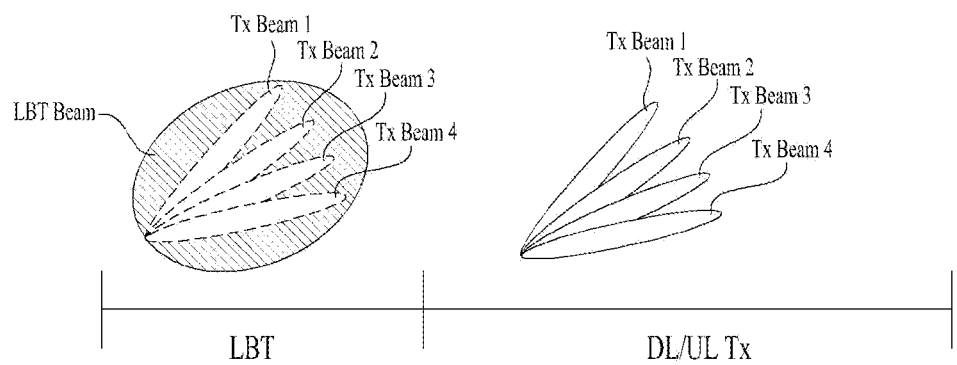

For example, referring to FIG. 23A, when four Tx beams (Tx Beam 1 to Tx Beam 4) are multiplexed using SDM, the BS or the UE may perform D-LBT using an LBT beam, which is a single LBT beam that covers all of the four Tx beams Tx Beam 1 to Tx Beam 4. For example, "the single LBT beam covers all of the four Tx beams" may mean that an LBT area through the single LBT beam includes a total interference range in which the four Tx beams affect interference.

In addition, upon succeeding in D-LBT using the LBT beam, the BS or the UE may perform DL/UL transmission through Tx Beam 1 to Tx Beam 4 that are multiplexed using SDM. In this case, each DL/UL transmission may be scheduled through each of Tx Beam 1 to Tx Beam 4, and the scheduled DL/UL signals/channels may be transmitted through SDM. On the other hand, DL/UL transmission may be performed over adjacent Tx beams. For example, if DL/UL signals/channels are scheduled over Tx Beam 1 and Tx Beam 2, the DL/UL signals/channels scheduled through Tx Beam 1 and Tx Beam 2 may be transmitted through SDM.

(3) D-LBT may be sequentially performed using multiple LBT beams that cover an interference range of one or more Tx beams to be transmitted through SDM within the COT. According to the success or failure of D-LBT of the multiple LBT beams, Tx beams in a beam direction capable of being continuously transmitted without a gap may be transmitted through SDM among beam directions in which D-LBT is successful. Each of the multiple LBT beams may be a relatively narrow beam.

Figure 23B:
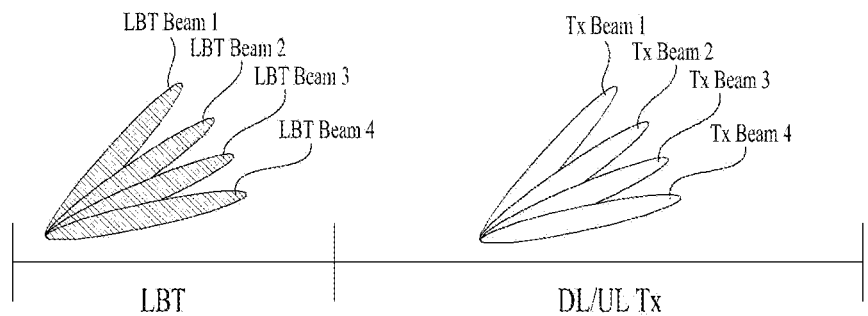

For example, referring to FIG. 23B, when four Tx beams (Tx Beam 1 to Tx Beam 4) are multiplexed using SDM, the BS or the UE may perform D-LBT on LBT Beam 1 to LBT Beam 4 that cover 4 Tx beams, respectively. Here, LBT Beam 1 is a beam that covers Tx Beam 1, and LBT Beam 2 is a beam that covers Tx Beam 2. In addition, LBT Beam 3 is a beam that covers Tx Beam 3, and LBT Beam 4 is a beam that covers Tx Beam 4. For example, an LBT area of LBT Beam 1 includes an interference range of Tx Beam 1 and may be greater than or equal to the interference range of Tx Beam 1 corresponding to the LBT area of LBT Beam 1. In other words, an LBT area of each LBT beam should necessarily include an interference range of a Tx beam corresponding to each LBT beam and may be greater than or equal to the interference range of the Tx beam. That is, the LBT area of each LBT beam may be greater than or equal to the interference range of a Tx beam corresponding to each LBT beam and may include all of the interference range of the corresponding Tx beam.

The BS or the UE may perform D-LBT simultaneously or sequentially on each of LBT Beam 1 to LBT Beam 4. For example, the BS or the UE may sequentially perform D-LBT on each LBT beam from D-LBT using LBT Beam 1 to D-LBT using LBT Beam 4 or simultaneously perform D-LBT on LBT Beam 1 to LBT Beam 4.

In this case, among LBT beams that have succeeded in D-LBT, Tx beams may be used for DL/UL transmission through SDM in a Tx beam direction capable of being continuously transmitted without a gap.

For example, if D-LBT for LBT Beam 2 fails and D-LBT for LBT Beams 1, 3, and 4 are successful, Tx Beam 3 and Tx Beam 4 may be used for DL/UL transmission through SDM. For example, each DL/UL transmission may be scheduled through each of Tx Beam 3 and Tx Beam 4, and the scheduled DL/UL signals/channels may be transmitted through SDM. On the other hand, transmission of one DL/UL signal/channel may be performed over Tx Beam 3 and Tx Beam 4. In other words, one DL/UL signal/channel may be scheduled to be transmitted through Tx Beam 3 and Tx Beam 4, and DL/UL signals/channels scheduled over Tx Beam 3 and Tx Beam 4 may be transmitted through SDM.

(4) In a situation in which multiple TRPs are configured, if different TRPs schedule UL signals/channels in the same symbol for the UE, so that the UE should simultaneously transmit the UL signals/channels to different TRPs in the same symbol (e.g., if the UE should simultaneously transmit the UL signals/channels through SDM to different TRPs), Tx power is divided by the number of Tx beams used by the UE for simultaneous transmission, so that Tx power allocated to each Tx beam may be reduced. Accordingly, an ED threshold for an LBT beam in a direction corresponding to each Tx beam may be configured to be increased based on the reduced Tx power applied to each Tx beam. For example, the ED threshold for the LBT beam may be increased as much as the reduced Tx power applied to each Tx beam or may be increased to correspond to the reduce Tx power or may be increased to be inversely proportional to the reduced Tx power.

In this case, if the UE has multiple panels for a plurality of Tx beams (or a plurality of LBT beams), the UE may perform D-LBT according to an LBT beam indicated for each panel. On the other hand, the method (4) of Embodiment #2-1 may be limitedly applied only to the UE.

2. Embodiment #2-2

An ED measurement type (or class) and an ED threshold that cover a total interference range of one or more Tx beams to be transmitted through TDM within the COT may be configured.

(1) The ED threshold may be configured/indicated based on {largest EIRP, average EIRP, minimum EIRP, Tx beam to be transmitted first, or Tx beam having longest Tx duration} among one or more Tx beams to be transmitted through TDM within the COT.

(2) D-LBT may be simultaneously performed on one or more Tx beams using a single LBT beam that covers an interference range of one or more Tx beams to be transmitted through TDM within the COT. The single LBT beam may be a relatively wide beam. DL/UL signals or channels may be sequentially transmitted for each Tx beam.

For example, referring to FIG. 24A, when four Tx beams (Tx Beam 1 to Tx Beam 4) are multiplexed using TDM, the BS or the UE may perform D-LBT using an LBT beam, which is a single LBT beam that covers all of the four Tx beams Tx Beam 1 to Tx Beam 4. For example, "the single LBT beam covers all of the four Tx beams" may mean that an LBT area through the single LBT beam includes a total interference range in which the four Tx beams affect interference.

In addition, upon succeeding in D-LBT using the LBT beam, the BS or the UE may perform DL/UL transmission through Tx Beam 1 to Tx Beam 4 that are multiplexed using TDM. In this case, each DL/UL transmission may be scheduled through each of Tx Beam 1 to Tx Beam 4, and the scheduled DL/UL signals/channels may be multiplexed using TDM and DL/UL signals/channels from a DL/UL signal/channel for Tx Beam 1 to a DL/UL signal/channel for Tx Beam 4 may be sequentially transmitted. On the other hand, DL/UL transmission may be performed over adjacent Tx beams. For example, if a first DL/UL signal/channel is scheduled over Tx Beam 1 and Tx Beam 2 and a second DL/UL signal/channel is scheduled over Tx Beam 3 and Tx Beam 4, the first DL/UL signal/channel and the second DL/UL signal/channel may be sequentially transmitted through TDM.

In the case of FIG. 24A, since a COT has already been obtained by determining that a channel is idle through an LBT beam when Tx beam switching is performed like the case in which a Tx beam is switched from Tx Beam 1 to Tx Beam 2 or from Tx Beam 1 and Tx Beam 2 to Tx Beam 3 and Tx Beam 4, the DL/UL signals/channels may be transmitted by performing Tx beam switching without performing additional LBT (i.e., based on a no-LBT mode).

(3) D-LBT may be sequentially performed using multiple LBT beams that cover an interference range of one or more Tx beams to be transmitted through TDM within the COT. The DL/UL signals/channels may be sequentially transmitted through Tx beams corresponding to LBT beams for which D-LBT is successful. Each of the multiple LBT beams may be a relatively narrow beam.

For example, referring to FIG. 24B, when four Tx beams (Tx Beam 1 to Tx Beam 4) are multiplexed using TDM, the BS or the UE may perform D-LBT on LBT Beam 1 to LBT Beam 4 that cover 4 Tx beams, respectively. Here, LBT Beam 1 is a beam that covers Tx Beam 1, and LBT Beam 2 is a beam that covers Tx Beam 2. In addition, LBT Beam 3 is a beam that covers Tx Beam 3, and LBT Beam 4 is a beam that covers Tx Beam 4. For example, an LBT area of LBT Beam 1 includes an interference range of Tx Beam 1 and may be greater than or equal to the interference range of Tx Beam 1 corresponding to the LBT area of LBT Beam 1. In other words, an LBT area of each LBT beam should necessarily include an interference range of a Tx beam corresponding to each LBT beam and may be greater than or equal to the interference range of the Tx beam. That is, the LBT area of each LBT beam may be greater than or equal to the interference range of a Tx beam corresponding to each LBT beam and may include all of the interference range of the corresponding Tx beam.

The BS or the UE may perform D-LBT simultaneously or sequentially on each of LBT Beam 1 to LBT Beam 4. For example, the BS or the UE may sequentially perform D-LBT on each LBT beam from D-LBT using LBT Beam 1 to D-LBT using LBT Beam 4 or simultaneously perform D-LBT on LBT Beam 1 to LBT Beam 4.

In this case, DL/UL signal/channels may be sequentially transmitted through respective Tx beams. If D-LBT for partial LBT beams is successful in performing D-LBT through LBT Beam 1 to LBT Beam 4, only DL/UL signals/channels for Tx beams corresponding to the LBT beams for which D-LBT is successful may be transmitted.

For example, if D-LBT for LBT Beam 2 fails and D-LBT for LBT Beams 1, 3, and 4 is successful, transmission of a DL/UL signal/channel scheduled for Tx Beam 2 may be dropped, and only DL/UL signals/channels scheduled for Tx Beams 1, 3, and 4 may be transmitted.

As another example, the DL/UL signal may be scheduled across two different Tx beams. For example, a first DL/UL signal/channel may be scheduled across Tx Beam 1 and Tx Beam 2, and a second DL/UL signal/channel may be scheduled across Tx Beam 3 and Tx Beam 4. In this case, if D-LBT in all LBT beams is successful, the first DL/UL signal/channel and the second DL/UL signal/channel may be multiplexed using TDM and then sequentially transmitted.

Meanwhile, if D-LBT for partial LBT beams fails, DL/UL signals/channels scheduled for Tx beams corresponding to the partial LBT beams may not be transmitted. For example, if D-LBT for LBT Beams 1, 3, and 4 are successful and D-LBT for LBT Beam 2 fails, the first DL/UL signal/channel may be dropped, and only the second DL/UL signal may be transmitted.

In the case of FIG. 24B, since a COT has already been obtained by determining that a channel is idle through LBT Beam 1 to LBT Beam 4 when Tx beam switching is performed like the case in which a Tx beam is switched from Tx Beam 1 to Tx Beam 2 or from Tx Beam 1 and Tx Beam 2 to Tx Beam 3 and Tx Beam 4, the DL/UL signals/channels may be transmitted by performing Tx beam switching without performing additional LBT (i.e., based on a no-LBT mode).

When DL/UL signals/channels are sequentially transmitted through TDM across different Tx beams within the COT obtained after succeeding in D-LBT in (2) and (3) of Embodiments #2-2 described above, if a time required for switching between two different Tx beams is equal to or less than a specific time T, non-random backoff-based LBT, i.e., Cat-2 LBT or Cat-1 LBT, may be performed and then the DL/UL signals/channels may be transmitted through a switched Tx beam. However, if the switching time between the two different Tx beams is greater than T, since the COT may not be maintained, random backoff-based Cat-3 LBT or Cat-4 LBT should be performed again.

Figure 25A:
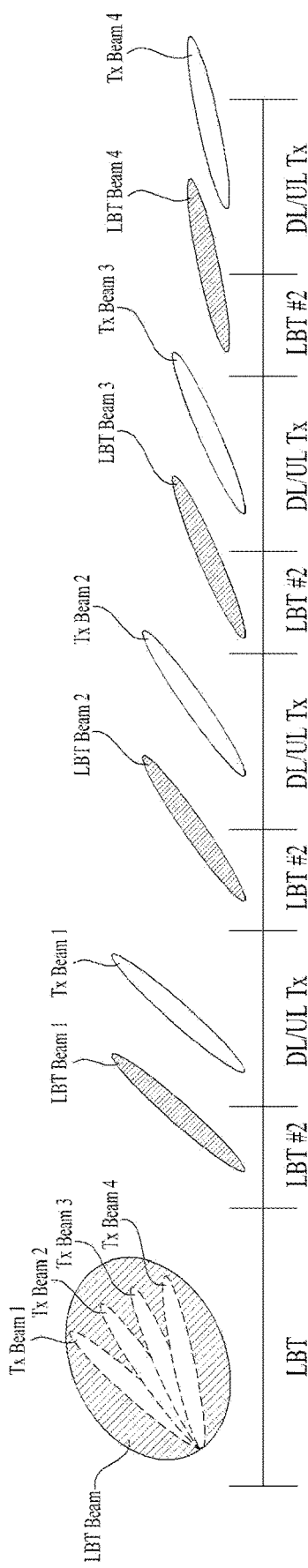
Figure 25B:
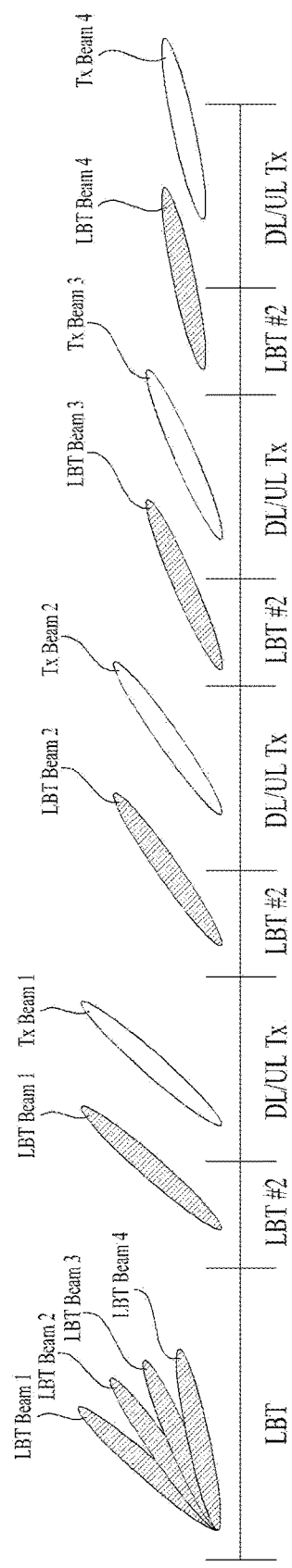

FIGS. 25A and 25B illustrate that non-random backoff-based Cat-2 LBT or Cat-1 LBT is performed when a Tx beam is switched in the same situation as in FIGS. 24A and 24B described above.

In the case of FIGS. 25A and 25B, although it has been confirmed that a channel is idle through an LBT beam (or LBT Beam 1 to LBT Beam 4) in a process of LBT #1 when Tx beam switching is performed as in the case in which a Tx beam is switched from Tx Beam 1 to Tx Beam 2 or from Tx Beam 1 and Tx Beam 2 to Tx Beam 3 and Tx Beam 4, since other noise might occur while the Tx beam is switched as time elapses, non-random backoff-based Cat-2 LBT or Cat-1 LBT may be performed (LBT #2) before the Tx beam is switched using an LBT beam corresponding to the Tx beam after switching.

For example, when the Tx beam is switched from Tx Beam 1 to Tx Beam 2, if the time required for switching from Tx Beam 1 to Tx Beam 2 is equal to or less than T, non-random backoff-based Cat-2 LBT or Cat-1 LBT may be performed using LBT Beam 2, and the DL/UL signal/channel may be transmitted through Tx Beam 2. As another example, when the Tx beam is switched from Tx Beam 1 and Tx Beam 2 to Tx Beam 3 and Tx Beam 4, if the time consumed for switching from Tx Beam 1 and Tx Beam 2 to Tx Beam 3 and Tx Beam 4 is equal to or less than T, non-random backoff-based Cat-2 LBT or Cat-1 LBT may be performed using LBT Beam 3 and LBT Beam 4, and the DL/UL signal/channel may be transmitted through Tx Beam 3 and Tx Beam 4.

In the above example, if the time consumed for switching from Tx Beam 1 to Tx Beam 2 or from Tx Beam 1 and Tx Beam 2 to Tx Beam 3 and Tx Beam 4 exceeds T, random backoff-based Cat-3 LBT or Cat-4 LBT should be performed using LBT Beam 2 or LBT Beam 3 and LBT Beam 4 to transmit the DL/UL signal/channel.

FIG. 25A illustrates that non-random backoff-based Cat-2 LBT or Cat-1 LBT is performed using LBT Beam 1 before the DL/UL signal/channel is transmitted through Tx Beam 1. However, since this transmission corresponds to transmission performed immediately after it is confirmed that the channel is idle through an LBT beam (or LBT Beam 1 to LBT Beam 4), non-random backoff-based Cat-2 LBT or Cat-1 LBT using LBT Beam 1 may be omitted. That is, after performing random backoff-based Cat-3 LBT or Cat-4 LBT through the LBT beam (or LBT Beam 1 to LBT Beam 4), non-random backoff-based Cat-2 LBT or Cat-1 LBT for first DL/UL signal/channel transmission may be omitted.

Meanwhile, whether the Tx beam is switched based on a no-LBT mode without additional LBT as illustrated in FIGS. 24A and 24B or whether the Tx beam is switched after performing non-random backoff-based Cat-2 LBT or Cat-1 LBT as illustrated in FIGS. 25A and 25B may follow the regulations of each country/region.

(1) of Embodiment #2-2 may be limitedly used only when other RATs do not exist in the vicinity of the UE or the BS. The COT length in (1) of Embodiment #2-2 may be constrained to be relatively shorter than in (2) of Embodiment #2-2.

The SDM/TDM transmission method and the ED threshold configuration method proposed in [Proposed Method #2] may be applicable to both the BS and the UE except for (4) of Embodiment #2-1. Even the ED measurement type indication may be limitedly applied to the case in which the BS indicates the type to the UE.

Hereinafter, [Proposed Method #2] will be described in detail.

A DL/UL signal/channel may be transmitted in an area in which D-LBT is successful during a COT acquired by success of D-LBT in a specific LBT beam direction. In addition, Tx beams in different directions may be multiplexed using SDM or TDM within the acquired COT.

On the other hand, transmission of the DL/UL signal/channel may be allowed only when directions and an interference range of Tx beams in different directions are all included in an area in which an LBT beam performs CCA (i.e., LBT). If it is desired to transmit the DL/UL signal/channel through a Tx beam in an area other than the area in which the LBT beams has performed CCA (i.e., LBT), D-LBT should be performed again in a direction including the corresponding area.

In other words, in order to transmit the DL/UL signal/channel by performing SDM or TDM on a plurality of Tx beams within the COT, an LBT beam should be configured/indicated in consideration of the directions and the interference range of the multiplexed Tx beams, and D-LBT should be performed using the corresponding LBT beam.

Therefore, the BS or the UE may configure an ED measurement type (or class) and an ED threshold in consideration of the directions and the interference range of one or more Tx beams to be transmitted within the COT.

First, as a method of configuring the ED threshold of an LBT beam, the ED threshold may be configured for/indicated to the UE based on one of {largest EIRP, average EIRP, or minimum EIRP} among one or more Tx beams to be transmitted through SDM within the COT as in Embodiment #2-1(a).

According to a conservative standard, since an area in which a Tx beam with the largest EIRP causes interference may be relatively large, if the ED threshold is configured based on the Tx beam with the largest EIRP power, the ED threshold may be configured to be relatively low. Alternatively, in order to slightly increase a channel access opportunity, the ED threshold may be configured based on a Tx beam having the lowest EIRP. Alternatively, the ED threshold may be configured based on an average EIRP of Tx beams to be multiplexed using SDM.

D-LBT may be simultaneously performed on one or more Tx beams using a single LBT beam that covers an interference range of one or more Tx beams to be transmitted through SDM in the COT. In this case, the single LBT beam may be a relatively wide beam.

The direction of the LBT beam and an Rx beam pattern may be configured for/indicated to the UE supporting ED measurement type 1 as a spatial relation between the LBT beam and the SSB as in the example of [Proposed Method #1].

Alternatively, D-LBT may be sequentially performed using multiple LBT beams that cover the interference range of one or more Tx beams to be transmitted through SDM in the COT. Each of the multiple LBT beams may be a relatively narrow beam.

In this case, as in the example of [Proposed Method #1], the spatial relation between the LBT beam and the CSI-RS may be configured for/indicated to the UE supporting ED measurement type 2. Here, the Tx beams may be multiplexed using SDM only in directions of Tx beams which may be continuously transmitted without a gap among Tx beams corresponding to directions of LBT beams that have succeeded in D-LBT according to the success or failure of D-LBT of multiple LBT beams.

For example, if D-LBT based on LBT Beam 1 and LBT Beams 3 and 4 is successful and D-LBT based on LBT Beam 2 fails as a result of sequentially performing D-LBT through LBT Beams 1, 2, 3, and 4, only Tx beams corresponding to LBT Beams 3 and 4 may be used through SDM to transmit the DL/UL signal/channel.

Characteristically, as in (4) of Embodiment #2-1, in a situation in which multiple TRPs are configured, if simultaneous transmission (e.g., SDM) is scheduled for the UE in the same symbol through respective UL grants from different TRPs, so that UL transmission should be performed in different TRP directions, Tx power is divided by the number of simultaneously transmitted Tx beams. Therefore, an ED threshold may be configured to be increased based on the reduced Tx power applied to each Tx beam. For example, an ED threshold for an LBT beam may be increased as much as the reduced Tx power applied to each Tx beam or may be increased to correspond to the reduced Tx beam or may be increased to be inversely proportional to the reduced Tx power. Therethrough, the channel access opportunity of the UE may be increased. In this case, if the UE has multiple panels for a plurality of Tx beams (or a plurality of LBT beams), D-LBT may be performed according to an LBT beam indicated for each panel.

As described in (1) of Embodiment #2-2, even when transmission is performed through TDM in a plurality of Tx beam directions within a COT, the ED threshold may be configured/indicated based on one of {largest EIRP, average EIRP, minimum EIRP, Tx beam to be transmitted first, or Tx beam having longest Tx duration} among one or more Tx beams to be transmitted through TDM within the COT.

As described in (2) of Embodiment #2-2, D-LBT may be simultaneously performed on one or more Tx beams using a single LBT beam that covers an interference range of one or more Tx beams to be transmitted through TDM within the COT. In this case, the single LBT beam may be a relatively wide beam.

The direction of the LBT beam and an Rx beam pattern may be configured for/indicated to the UE supporting ED measurement type 1 as a spatial relation between the LBT beam and the SSB as in the example of [Proposed Method #1].

Alternatively, as described in (3) of Embodiment #2-2, D-LBT may be sequentially performed using multiple LBT beams that cover the interference range of one or more Tx beams to be transmitted through TDM within the COT. Each of the multiple LBT beams may be a relatively narrow beam.

Therefore, in this case, as in the example of [Proposed Method #1], the spatial relation between the LBT beam and the CSI-RS may be configured for/indicated to the UE supporting ED measurement type 2.

As in (2) of Embodiment #2-1 and (2) of Embodiment #2-2, performing D-LBT using a single LBT beam that covers the interference range of one or more Tx beams has an advantage of being not significantly affected by the capabilities of the UE or the BS.

In other words, when performing D-LBT using a single LBT beam that covers the interference range of one or more Tx beams, even when the capability of the UE or the BS is low as in the case in which the number of panels with which the UE or BS performs LBT is 1 or the number of panels with which the UE or the BS is capable of simultaneously performing LBT is 1, construction costs or implementation issues (or implementation difficulty) of the UE or the BS may not be high because the UE or the BS may perform D-LBT for one or more Tx beams.

Further, as in (3) of Embodiment #2-1 and (3) of Embodiment #2-2, performing D-LBT using multiple LBT beams each covering the interference range of one or more Tx beams may increase the transmission efficiency of the UE or the BS.

For example, when transmission of the DL/UL signal/channel is scheduled one by one for each of Tx Beam 1 to Tx Beam 4, if D-LBT for LBT Beam 2 corresponding to Tx Beam 2 fails and D-LBT for LBT Beam 1, LBT Beam 3, and LBT Beam 4 corresponding to Tx Beam 1, Tx Beam 3, and Tx Beam 4 is successful, only transmission of the DL/UL signal/channel scheduled for Tx Beam 2 may be dropped and DL/UL signals/channels scheduled for Tx Beam 1, Tx Beam 3, and Tx Beam 4 may be transmitted, so that transmission efficiency and resource utilization efficiency may be increased.

[Proposed Method #3]

When the BS or the UE performs LBT always in units of an LBT bandwidth before transmission, LBT bandwidth (hereinafter referred to as 'LBT-BW') considering the relationship with a BWP/CC may be configured.

1. Embodiment #3-1

An LBT-BW area associated with a corresponding BWP/CC for each BWP/CC may be configured. That is, the LBT-BW area used for LBT for corresponding BWP/CC transmission may be configured. For example, a starting RB and a bandwidth (BW) of the LBT-BW area may be configured. Alternatively, a starting RB and an ending RB of the LBT-BW area may be configured. Alternatively, a starting RB of the LBT area and the number of RBs of the LBT-BW area may be configured.

2. Embodiment #3-2

Without separate association with a BWP/CC, each LBT-BW or LBT-BW set may be configured. For example, if a starting RB and a BW of an LBT-BW area, and the number N of LBT-BWs are configured, N (consecutive) LBT-BWs having a BW size from the starting RB may be configured. In this case, an ending RB or the number of RBs may be configured instead of the BW. For example, the starting RB and the ending RB of the LBT-BW area, and the number N of LBT-BWs may be configured, or the starting RB of the LBT-BW area, the number of RBs, and the number N of LBT-BWs may be configured.

3. Embodiment #3-3

Only a minimum LBT-BW (e.g., min-BW) value may be configured and an actual LBT-BW may be determined according to the relationship with a BWP/CC size.

For example, for a BWP/CC smaller than min-BW, the actual LBT-BW may be configured as min-BW (i.e., LBT-BW=min-BW). For a BWP/CC greater than min-BW, the LBT-BW may be configured as the BWP/CC (i.e., LBT-BW=BWP/CC).

4. Embodiment #3-4

The BS may configure an LBT BW index for each CC preconfigured as carrier aggregation (CA) with respect to the UE for which CCs of various BW sizes are configured as CA. The BS may perform LBT according to an LBT BW index indicated during UL scheduling.

The relationship between the BWP/CC and the LBT-BW may have a structure in which a plurality of (narrow) LBT-BWs is included in one (wide) BWP/CC as in legacy Rel-16 NR-U or, conversely, a structure in which one (wide) BWP/CC or a plurality of (wide) BWPs/CCs is included in a single LBT-BW. One BWP/CC may be configured to be confined in only one LBT-BW. That is, a configuration in which one BWP/CC spans a plurality of LBT-BWs may be excluded.

Hereinafter, [Proposed method #3] will be described in detail.

In Rel-16 NR-U, a unit LBT-BW always using 20 MHz as a basic unit of LBT has been considered in consideration of coexistence of requirements such as a nominal channel BW defined in a 5-GHz band regulation (e.g., ETSI EN 302 893) with an incumbent system (e.g., 802.11-series Wi-Fi system).

However, in FR4 (e.g., a band of 60 GHz) being newly considered in Rel-17, the definition of the unit LBT-BW to be performed before the BS and the UE perform transmission is ambiguous upon considering regulation (e.g., ETSI EN 302 567) and the incumbent system (e.g., WiGig). Therefore, it is necessary to define an LBT-BW in which the BS and the UE may efficiently perform LBT prior to transmission and transmit and receive DL/UL signals/channels in the FR4 band.

For example, if the LBT-BW is not defined, the BS or the UE may perform LBT on a total channel BW or a BWP BW for transmission or perform LBT as much as a transmission BW for transmission (e.g., from the lowest RB to the highest RB used for transmission).

In the case of multi-carrier transmission for which intra-band CA is configured, multiple LBT operations may be separately performed for each channel BW. Alternatively, LBT may be performed only as much as a transmission BW for each CC. Therefore, it is necessary to configure the LBT-BW in consideration of the relationship between the LBT-BW and the BWP/CC. Therethrough, a problem of inequality of LBT opportunities that may occur when the BS and the UE perform LBT based on an unnecessarily wide BW or when the UE and BS perform LBT using BWs of different sizes may be eliminated, and LBT and transmission/reception may be efficiently performed.

Embodiment #3-1 is a method of configuring the LBT-BW area associated with a corresponding BWP/CC for each BWP/CC, i.e., a method of configuring the LBT-BW area used for LBT for corresponding BWP/CC transmission. For example, a starting RB and BW size of an LBT-BW associated with a specific BWP/CC may be configured.

Alternatively, a starting RB and an ending RB of an LBT-BW associated with a specific BWP/CC may be configured. Alternatively, the starting RB and the number of RBs of the LBT-BW associated with a specific BWP/CC may be configured.

Embodiment #3-2 is a method of configuring each LBT-BW or LBT-BW set without separate association with a BWP/CC. For example, if a starting RB and a BW of an LBT-BW, and the number of LBT-BWs are configured, N (consecutive) LBT-BWs having a BW size from the starting RB may be configured. In this case, an ending RB or the number of RBs may be configured instead of the BW. For example, a starting RB and an ending RB of the LBT-BW, and the number of LBT-BWs may be configured or the starting RB of the LBT-BW, the number of RBs of the LBT-BW, and the number N of LBT-BWs may be configured.

Embodiment #3-3 may configure only a minimum LBT-BW (e.g., min-BW) value and determine an actual LBT-BW according to the relationship with a BWP/CC size. For example, for a BWP/CC smaller than min-BW, the actual LBT-BW may be configured as min-BW (i.e., LBT-BW=min-BW). For a BWP/CC greater than min-BW, LBT-BW may be configured as the corresponding BWP/CC (i.e., LBT-BW=BWP/CC).

For example, if LBT-BW=max (min-BW, BWP BW, or CC BW), the size of the LBT-BW may be determined as follows.

1) For BWP/CC>min-BW, LBT-BW=BWP/CC
2) For BWP/CC<min-BW, LBT-BW=min-BW
3) For BWP/CC=min-BW, LBT-BW=BWP/CC=min-BW Here, in the case of 2), a starting position or a center position of the min-BW may be configured to be equal to a starting position or a center position of the BWP/CC. Alternatively, the position of the LBT-BW may be configured by setting a relative value of the starting position or the center position of the min-BW from the starting position or the center position of the BWP/CC.

As an example of Embodiment #3-4, if three CCs of {CC1 with a size of 400M, CC2 with a size of 200M, CC3 with a size of 200M} are configured as CA for the UE, and if LBT-BW indexes corresponding to CC1, CC2, and CC3 are configured as {0, 1, 1}, respectively, since only {CC1} is included in LBT-BW index 0, LBT may be performed based on an LBT-BW with a size of 400 MHz. In addition, since LBT BW index 1 includes {CC2, CC3}, LBT may be performed based on an LBT-BW with a size of 400 MHz obtained by adding CC2 and CC3.

As another example, if LBT BW index={0, 0, 1}, since {CC1, CC2} are included in LBT-BW index 0, LBT based on a size of 600 MHz may be performed. Since only {CC3} is included in LBT-BW index 1, LBT based on a size of 200 MMHz may be performed.

As another example, it may be regulated that a starting RB and an ending RB are configured for each LBT-BW index and one CC or a plurality of CCs may be completely included within an RB range configured for each LBT-BW index. In other words, the starting RB and/or the ending RB may be defined to always be configured at the boundary of a CC BW. That is, it may be regulated that the starting RB and/or the ending RB is not configured to overlap only a part of a CC BW within the CC BW. As an example different from the above example, the starting RB and the number of RBs may be configured for each LBT-BW index.

One BWP/CC is configured to be confined only in one LBT-BW. Accordingly, a configuration in which one BWP/CC spans a plurality of LBT-BWs is excluded. Even if the LBT-BW configured for the UE is larger than the size of the BWP/CC, LBT should always be performed with the LBT-BW size through CA, etc.

An ED threshold used to perform LBT may be expressed as a function of the size of an output power of the UE or BS and the size of an operating channel BW. The relationship between these two factors and the ED threshold may be expressed as in [Equation 1].

$$EDT = -80dBm + 10*\log10\left(\frac{Pmax}{Pout}\right) + 10*\log10(\text{Operating Channel } BW \text{ in MHz})$$ [Equation 1]

Here, the operating channel BW may be the size of a BW of LBT performed by the UE or the BS or mean the BW size of a BWP or the transmission BW with which transmission is actually performed. However, in a 60-GHz band, since D-LBT that performs LBT only in a specific Tx direction as a target, rather than O-LBT performed in a 5-GHz band, is considered, the ED threshold may be differently configured according to the relationship between a sensing beam and a Tx beam (e.g., beam correspondence).

The capability of the UE for the above-described beam correspondence is defined in Section 6.6 of TS 38.101-2 and the BS may differently configure the ED threshold used to perform D-LBT according to the beam correspondence capability of the UE as follows.

1) A UE supporting beamCorrespondenceWithoutUL-BeamSweeping may well establish beam correspondence even without BM such as UL beam sweeping and UL beam indication of a network. In this case, the UE should satisfy requirements such as minimum peak EIRP and spherical coverage even without BM.

2) A UE that does not support beamCorrespondenceWithoutUL-BeamSweeping may satisfy requirements such as minimum peak EIRP and spherical coverage through a BM procedure. In addition, the UE may satisfy a relaxed requirement of about 3 dB even without the BM procedure.

[Proposed Method #4]

The UE may adjust the ED threshold used to perform LBT according to whether the UE supports beam correspondence (BC) and whether the BM procedure is performed.

1. Embodiment #4-1

In the case of a UE supporting beamCorrespondenceWithoutUL-BeamSweeping, the ED threshold may be calculated in consideration of only the output power and the operating channel BW.

2. Embodiment #4-2

In the case of a UE that does not support beamCorrespondenceWithoutUL-BeamSweeping, the ED threshold may be calculated using at least one of the following methods.

(1) An additional penalty value, X dB, explicitly configured/indicated by the BS may be applied to the ED threshold calculated based on the output power and the operating channel BW according to [Equation 1]. For example, the ED threshold may be decreased by applying the penalty value.

(2) If there is no penalty of X dB explicitly configured by the BS, X=3 dB may be applied as a default.

If an additional configuration is received from the BS, the same ED threshold as in Embodiment #4-1 in the case of having the BC capability may be used without penalty.

(3) The penalty may be implicitly applied depending on whether an SRS used for BM is configured for the UE.

In the case in which the SRS used for BM is not configured, a penalty of a 3 dB may be added to the ED threshold calculated based on the output power and the operating channel BW according to [Equation 1], so that LBT may be performed using a lower ED threshold.

Alternatively, when only an SRS in which repetition is set to 'OFF' is configured or after the configured SRS is transmitted at least N times (assuming that a BM procedure has been performed), the same ED threshold as in Embodiment #4-1 with the BC-related capability may be used.

(4) Alternatively, even if the UE does not support beamCorrespondenceWithoutUL-BeamSweeping, X=0 dB may be applied as a default X value for calculating the ED threshold (until a penalty of X dB is explicitly configured by the BS). This is because a special problem does not occur even if the ED threshold is not differently configured depending on whether beamCorrespondenceWithoutUL-BeamSweeping is supported according to the number of beams and the number of UEs operated in a cell.

[Proposed method #4] will be described in detail.

As described above, when BC is established between DL beams and UL beams, either a procedure for determining a DL beam pair or a BM procedure for determining a UL beam pair may be omitted. Establishing BC may mean that it may be assumed that a BS Tx beam and a BS Rx beam coincide and a UE Tx beam and a UE Rx beam coincide in communication between the BS and the UE. Here, the BS Tx beam and the BS Rx beam may mean a DL Tx beam and a DL Rx beam, respectively, and the UE Tx beam and the UE Rx beam may mean a UL Tx beam and a UL Rx beam, respectively.

In the case of D-LBT performed by a Tx end, energy in an area that is subjected to interference when a Tx beam is transmitted (e.g., an area equal to or greater than an area in which the Tx beam affects interference) may be measured through an Rx beam in consideration of a Tx beam direction in which the BS or the UE desires to perform transmission. Then, whether a channel is idle or busy may be determined by comparing the measured energy with the ED threshold. In addition, whether to perform transmission may be determined based on determination of whether the channel is idle or busy. Therefore, when performing LBT through the Rx beam, the ED threshold may be adjusted according to BC and reflected in determining whether the channel is idle or busy.

ED threshold adjustment based on BC may be changed depending on whether the UE supports beamCorrespondenceWithoutUL-BeamSweeping and whether a BM procedure is performed. In the case of the UE supporting beamCorrespondenceWithoutUL-BeamSweeping, the ED threshold may be calculated by [Equation 1] considering only the output power and the operating channel BW without a separate penalty and may be applied to LBT.

In the case of the UE that does not support beamCorrespondenceWithoutUL-BeamSweeping, an additional penalty of X dB explicitly configured/indicated by the BS may be applied to the ED threshold calculated using the output power and operating channel BW of [Equation 1]. For example, the ED threshold may be decreased by applying the penalty value. Alternatively, if there is no penalty value of X dB configured by the BS, X=3 dB may be applied as a default. However, if an additional configuration is received from the BS, the same ED threshold value as in Embodiment #4-1 in the case of having the BC capability may be used without penalty.

As another example, the penalty may be implicitly applied according to whether the SRS used for BM is configured for the UE.

When the SRS used for BM is not configured, a penalty of 3 dB may always be applied to the ED threshold calculated based on the output power and operating channel BW of [Equation 1], so that LBT may be performed using the lower obtained ED threshold.

If only the SRS used for BM is configured or after the configured SRS is transmitted at least N times (assuming that the BM procedure has been performed), the same ED threshold as in Embodiment #4-1 with the BC-related capability value may be used.

Alternatively, even if the UE does not support beamCorrespondenceWithoutUL-BeamSweeping, X=0 dB may be applied as a default X value for calculating the ED threshold (until a penalty of X dB is explicitly configured by the BS). This is because a special problem does not occur even if the ED threshold is not differently configured depending on whether beamCorrespondenceWithoutUL-BeamSweeping is supported according to the number of beams and the number of UEs operated in a cell.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 26:
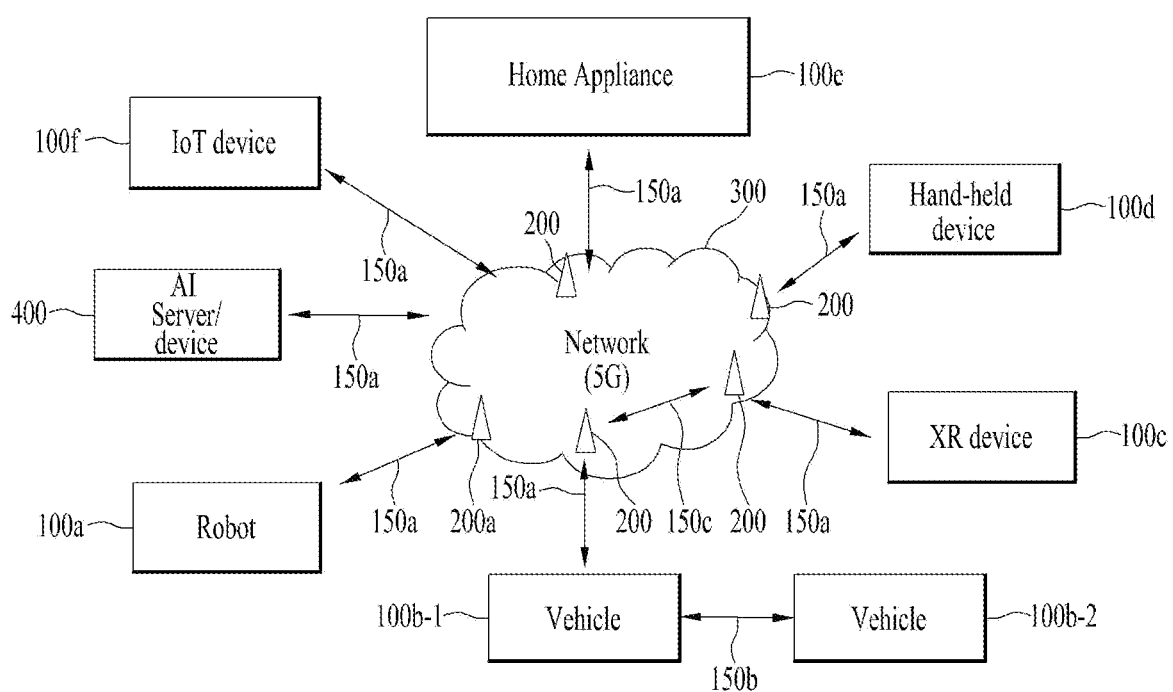
FIG. 26 illustrates an exemplary communication system applied to the present disclosure.

FIG. 26 illustrates a communication system 1 applied to the present disclosure.

Referring to FIG. 26, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 27:
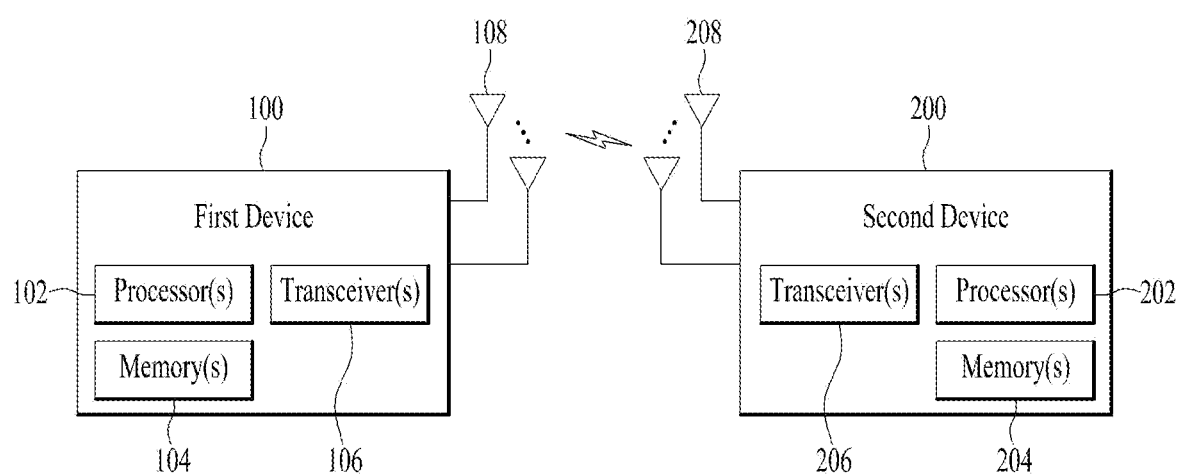
FIG. 27 illustrates an exemplary wireless device applicable to the present disclosure.

FIG. 27 illustrates wireless devices applicable to the present disclosure.

Referring to FIG. 27, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104, and further include one or more transceivers 106 and/or one or more antennas 108. The processor(s) 102 may control the memory (s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

Specifically, the processor 102 may obtain an ED threshold for energy sensing. For example, the processor 102 may obtain the ED threshold based on at least one of [Proposed Method #1], [Proposed Method #2], or [Proposed Method #4]. However, the processor may also obtain the ED threshold by the prior art and methods other than the proposed methods according to the present disclosure.

The processor 102 may obtain an LBT-BW. For example, the processor 102 may obtain the LBT-BW based on [Proposed Method #3]. However, a method of obtaining the LBT-BW according to [Proposed Method #3] may be omitted. If the method of obtaining the LBT-BW according to [Proposed Method #3] is omitted, the processor 102 may perform LBT based on an LBT-BW (e.g., 20 MHz) according to the prior art or perform LBT using a configured BWP size as an LBT-BW unit.

The processor 102 may perform LBT based on the obtained ED threshold and/or LBT-BW. In addition, upon succeeding in LBT, the processor 102 may control the transceiver 106 to transmit a UL signal to the BS. For example, the processor 102 may perform LBT based on [Proposed Method #2] for multiplexed Tx beams and control the transceiver 106 to transmit the UL signal.

The processor 102 may control the transceiver 106 to receive a DL signal from the BS.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

Specifically, the processor 202 may obtain an ED threshold for energy sensing. For example, the processor 202 may acquire the ED threshold based on at least one of [Proposed Method #1], [Proposed Method #2], or [Proposed Method #4]. However, the processor 202 may also obtain the ED threshold by the prior art and methods other than the proposed methods according to the present disclosure.

The processor 202 may configure an LBT-BW. For example, the processor 202 may configure the LBT-BW based on [Proposed Method #3]. However, a method of configuring the LBT-BW according to [Proposed Method #3] may be omitted. If the method of configuring the LBT-BW according to [Proposed Method #3] is omitted, the processor 202 may perform LBT based on an LBT-BW (e.g., 20 MHz) according to the prior art or perform LBT using a configured BWP size as an LBT-BW unit.

The processor 202 may perform LBT based on the obtained ED threshold and/or LBT-BW (S2205). Upon succeeding LBT, the processor 202 may control the transceiver 206 to transmit a DL signal to the UE. For example, the processor 202 may perform LBT for multiplexed Tx beams based on [Proposed Method #2] and control the transceiver 206 to transmit the DL signal.

The processor 202 may control the transceiver 206 to receive a UL signal from the UE.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 28:
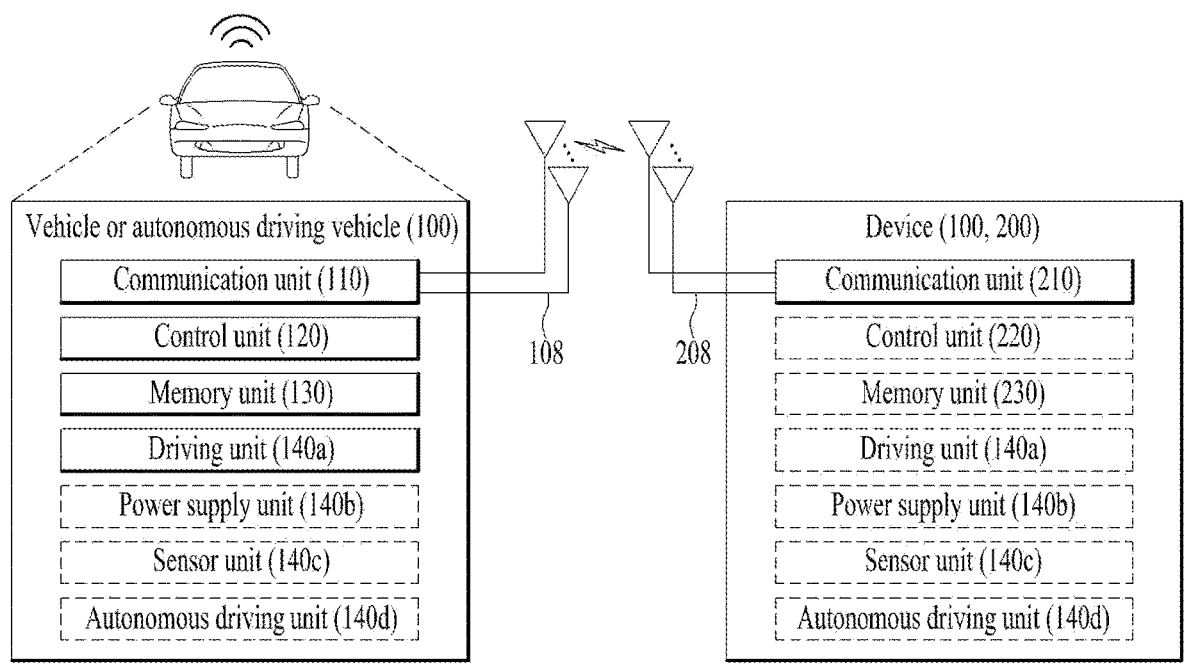
FIG. 28 illustrates an exemplary vehicle or autonomous driving vehicle applicable to the present disclosure.

FIG. 28 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above-described method of performing a CAP and the apparatus therefor have been described based on an example applied to a 5G NR system, the method and apparatus are applicable to various wireless communication systems in addition to the 5G NR system.

What is claimed is:

1. A method of performing Uplink (UL) transmissions by a user equipment (UE) in a wireless communication system, the method comprising:
   performing at least one Channel Access Procedure (CAP) on at least one sensing beam; and
   performing the UL transmissions through transmission beams based on at least one channel for the at least one CAP being sensed to be idle,
   wherein the at least one sensing beam covers the transmission beams, and the transmission beams are multiplexed using time division multiplexing (TDM),
   wherein based on the at least one channel being idle by the at least one CAP, the UE performs an additional CAP before switching between the transmission beams,
   wherein the additional CAP is performed using one type of a first type CAP or a second type CAP based on a time required for switching between the transmission beams, and
   wherein the first type CAP is a CAP based on a random back-off, and the second type CAP is a CAP not based on the random back-off.

2. The method of claim 1, wherein the transmission beams are multiplexed in time domain.

3. The method of claim 1,
   wherein, based on the time required for the switching exceeding a predefined specific time, the UE performs the additional CAP based on the first type CAP, and
   wherein, based on the time required for the switching being less than or equal to a predefined specific time, the UE performs the additional CAP based on the second type CAP.

4. A user equipment (UE) of performing Uplink (UL) transmissions in a wireless communication system, the UE comprising:
   at least one transceiver;
   at least one processor; and
   at least one memory operably connected to the at least one processor and configured to store instructions that, when executed, cause the at least one processor to perform operations comprising:
   performing, through the at least one transceiver, at least one Channel Access Procedure (CAP) on at least one sensing beam; and
   performing, through the at least one transceiver, the UL transmissions through transmission beams based on at least one channel for the at least one CAP being sensed to be idle,
   wherein the at least one sensing beam covers the transmission beams, and the transmission beams are multiplexed using time division multiplexing (TDM),
   wherein based on the at least one channel being idle by the at least one CAP, the UE performs an additional CAP before switching between the transmission beams,
   wherein the additional CAP is performed using one type of a first type CAP or a second type CAP based on a time required for switching between the transmission beams, and
   wherein the first type CAP is a CAP based on a random back-off, and the second type CAP is a CAP not based on the random back-off.

5. The UE of claim 4,
   wherein based on the time required for the switching exceeding a predefined specific time, the UE performs the additional CAP based on the first type CAP, and
   wherein, based on the time required for the switching being less than or equal to a predefined specific time, the UE performs the additional CAP based on the second type CAP.

6. A method of performing Downlink (DL) transmissions by a base station (BS) in a wireless communication system, the method comprising:
   performing at least one Channel Access Procedure (CAP) on at least one sensing beam; and
   performing the DL transmissions through transmission beams based on at least one channel for the at least one CAP being sensed to be idle,
   wherein the at least one sensing beam covers the transmission beams, and the transmission beams are multiplexed using time division multiplexing (TDM),
   wherein based on the at least one channel being idle by the at least one CAP, the BS performs an additional CAP before switching between the transmission beams,
   wherein the additional CAP is performed using one type of a first type CAP or a second type CAP based on a time required for switching between the transmission beams, and
   wherein the first type CAP is a CAP based on a random back-off, and the second type CAP is a CAP not based on the random back-off.

7. A base station (BS) of performing Downlink (DL) transmissions in a wireless communication system, the BS comprising:
   at least one transceiver;
   at least one processor; and
   at least one memory operably connected to the at least one processor and configured to store instructions that, when executed, cause the at least one processor to perform operations comprising:
   performing, through the at least one transceiver, at least one Channel Access Procedure (CAP) on at least one sensing beam; and
   performing, through the at least one transceiver, the DL transmissions through transmission beams based on at least one channel for the at least one CAP being sensed to be idle,
   wherein the at least one sensing beam covers the transmission beams, and the transmission beams are multiplexed using time division multiplexing (TDM),
   wherein based on the at least one channel being idle by the at least one CAP, the BS performs an additional CAP before switching between the transmission beams,
   wherein the additional CAP is performed using one type of a first type CAP or a second type CAP based on a time required for switching between the transmission beams, and
   wherein the first type CAP is a CAP based on a random back-off, and the second type CAP is a CAP not based on the random back-off.

8. The method of claim 6,
   wherein based on the time required for the switching exceeding a predefined specific time, the BS performs the additional CAP based on the first type CAP, and
   wherein, based on the time required for the switching being less than or equal to a predefined specific time, the BS performs the additional CAP based on the second type CAP.

9. The BS of claim 7,
   wherein based on the time required for the switching exceeding a predefined specific time, the BS performs the additional CAP based on the first type CAP, and
   wherein, based on the time required for the switching being less than or equal to a predefined specific time, the BS performs the additional CAP based on the second type CAP.

* * * * *